(12) United States Patent
Pople et al.

(10) Patent No.: US 12,298,966 B2
(45) Date of Patent: *May 13, 2025

(54) DISTRIBUTED TRANSACTION EXECUTION MANAGEMENT IN DISTRIBUTED DATABASES

(71) Applicant: Couchbase, Inc.

(72) Inventors: Graham Timothy Pople, Manchester (GB); Brett Phillip James Lawson, Surrey (CA); Matthew William Ingenthron, Huntington Beach, CA (US); David John Finlay, Mountain View, CA (US); Shivani Gupta, Irvine, CA (US); John Sae Liang, Palo Alto, CA (US); Stephen Ching-Sing Yen, Atherton, CA (US)

(73) Assignee: Couchbase, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/418,097

(22) Filed: Jan. 19, 2024

(65) Prior Publication Data
US 2024/0160624 A1    May 16, 2024

Related U.S. Application Data

(63) Continuation of application No. 17/327,455, filed on May 21, 2021, now Pat. No. 12,032,560.
(Continued)

(51) Int. Cl.
*G06F 16/23* (2019.01)
*G06F 9/54* (2006.01)
(Continued)

(52) U.S. Cl.
CPC .......... *G06F 16/2379* (2019.01); *G06F 9/547* (2013.01); *G06F 16/215* (2019.01); *G06F 16/27* (2019.01)

(58) Field of Classification Search
CPC . G06F 16/23; G06F 9/54; G06F 16/21; G06F 16/27; G06F 16/24
See application file for complete search history.

(56) References Cited

U.S. PATENT DOCUMENTS

| 6,314,417 B1 | 11/2001 | Bennett et al. |
| 6,397,228 B1 | 5/2002 | Lamburt et al. |

(Continued)

FOREIGN PATENT DOCUMENTS

| EP | 3182300 A1 | 6/2017 |
| WO | WO 2020/113314 A1 | 6/2020 |

OTHER PUBLICATIONS

Gordo, A. et al., "Large-Scale Document Image Retrieval and Classification with Run-Length Histograms and Binary Embeddings," Pattern Recognition, vol. 46, Dec. 19, 2012, pp. 1989-1905.
(Continued)

*Primary Examiner* — Maher N Algibhah
(74) *Attorney, Agent, or Firm* — Fenwick & West LLP

(57) ABSTRACT

A distributed database system for handling transactions from multiple client systems. A database node receives a request to execute a transaction from a first client, involving a record modification. This record has an associated check-and-set (CAS) value that changes with modifications. The record is sent to the first client, which identifies the CAS value. Similarly, a second client sends a request for another transaction, receives the record, and identifies the CAS value. One of these clients attempts to stage a mutation based on their transaction. This includes sending the previously received CAS value. The system checks for a CAS value mismatch, indicating a conflicting mutation from another transaction. If a mismatch is detected, the transaction attempt is aborted to prevent conflicts. Otherwise, the mutation is staged, and the CAS value is updated.

20 Claims, 10 Drawing Sheets

Related U.S. Application Data

(60) Provisional application No. 63/029,325, filed on May 22, 2020.

(51) Int. Cl.
 *G06F 16/215* (2019.01)
 *G06F 16/27* (2019.01)

(56) References Cited

U.S. PATENT DOCUMENTS

| | | |
|---|---|---|
| 7,689,565 B1 | 3/2010 | Gandhi et al. |
| 9,760,571 B1 | 9/2017 | Ben-Natan et al. |
| 10,489,356 B1 | 11/2019 | Shah et al. |
| 10,983,981 B1 | 4/2021 | Sharma et al. |
| 11,144,275 B1 | 10/2021 | Hinckley et al. |
| 11,294,896 B2 | 4/2022 | Miao et al. |
| 11,397,750 B1 | 7/2022 | Lekakis et al. |
| 2005/0190949 A1 | 9/2005 | Weber |
| 2007/0239661 A1 | 10/2007 | Cattell et al. |
| 2008/0120304 A1 | 5/2008 | Calio et al. |
| 2010/0138407 A1 | 6/2010 | Fraser et al. |
| 2010/0180257 A1 | 7/2010 | Dern |
| 2012/0102377 A1 | 4/2012 | Viswanathan et al. |
| 2012/0124563 A1 | 5/2012 | Chung et al. |
| 2012/0196615 A1* | 8/2012 | Edge .............. H04W 4/029 455/456.1 |
| 2013/0006950 A1 | 1/2013 | Adayilamuriyil et al. |
| 2013/0339960 A1 | 12/2013 | Greiner et al. |
| 2014/0379693 A1 | 12/2014 | May et al. |
| 2016/0055261 A1 | 2/2016 | Reinhardt et al. |
| 2016/0110403 A1 | 4/2016 | Lomet et al. |
| 2016/0378820 A1 | 12/2016 | Marcotte |
| 2017/0031990 A1 | 2/2017 | Chakkappen et al. |
| 2017/0161352 A1 | 6/2017 | Horii |
| 2017/0177697 A1 | 6/2017 | Lee et al. |
| 2017/0220617 A1 | 8/2017 | Bortnikov et al. |
| 2018/0095968 A1 | 4/2018 | Seki |
| 2018/0121492 A1 | 5/2018 | Sawhney |
| 2018/0165343 A1 | 6/2018 | Fan et al. |
| 2018/0253452 A1 | 9/2018 | Callan et al. |
| 2018/0349458 A1 | 12/2018 | Guirguis et al. |
| 2019/0102416 A1 | 4/2019 | Zhang et al. |
| 2019/0138743 A1 | 5/2019 | Nerurkar et al. |
| 2020/0160289 A1 | 5/2020 | Mahajan et al. |
| 2020/0327545 A1 | 10/2020 | Xie |
| 2020/0379999 A1 | 12/2020 | Xia et al. |
| 2020/0387496 A1 | 12/2020 | Holmes et al. |
| 2021/0240498 A1 | 8/2021 | Padmanabhan et al. |
| 2022/0019575 A1 | 1/2022 | Qian |

OTHER PUBLICATIONS

United States Office Action, U.S. Appl. No. 17/327,397, filed Nov. 7, 2023, 44 pages.

United States Office Action, U.S. Appl. No. 17/711,982, filed Dec. 22, 2022, 8 pages.

United States Office Action, U.S. Appl. No. 17/007,561, filed Apr. 1, 2022, 17 pages.

United States Office Action, U.S. Appl. No. 17/327,397, filed Mar. 27, 2024, 38 pages.

Gottschlich, J.E. et al., "An Efficient Software Transactional Memory Using Commit-Time Invalidation," Code Generation and Optimization, Apr. 2010, pp. 101-110.

Mayuram, R., "Couchbase Brings Multi-Document ACID Transactions to JSON Database," Aug. 9, 2019, pp. 1-10, [Online] [Retrieved on Jun. 8, 2021] Retrieved from the Internet <URL: https://blog.couchbase.com/couchbase-brings-multi-document-acid-transaction-to-json-database/>.

PCT International Search Report and Written Opinion, PCT Application No. PCT/IB2021/057413, Nov. 9, 2021, 12 pages.

PCT International Search Report and Written Opinion, PCT Application No. PCT/US2021/033795, Aug. 17, 2021, 17 pages.

"redis-transactions," HEXH's Blog, Jul. 3, 2015, 11 pages, Retrieved from the internet <URL:http://dangxia.github.io/2015/07/03/redis/redis-transactions/>.

United States Office Action, U.S. Appl. No. 17/007,561, filed Apr. 1, 2022, 21 pages.

United States Office Action, U.S. Appl. No. 17/327,397, filed Aug. 17, 2022, 32 pages.

United States Office Action, U.S. Appl. No. 17/327,397, filed Mar. 3, 2023, 31 pages.

United States Office Action, U.S. Appl. No. 17/327,455, filed Jun. 2, 2023, 23 pages.

United States Office Action, U.S. Appl. No. 17/327,455, filed Nov. 10, 2022, 31 pages.

United States Patent Office, Office Action, U.S. Appl. No. 17/327,397, Sep. 30, 2024, 38 pages.

* cited by examiner

DISTRIBUTED TRANSACTION EXECUTION MANAGEMENT IN DISTRIBUTED DATABASES

CROSS-REFERENCE TO RELATED APPLICATIONS

This application is a continuation of U.S. patent application Ser. No. 17/327,455, filed May 21, 2021, which claims the benefit of and priority to U.S. Provisional Application No. 63/029,325, filed May 22, 2020, which are incorporated by reference herein in its entirety.

BACKGROUND

Field of Art

This disclosure relates in general to distributed databases, and in particular to managing transaction execution in distributed databases.

Description of the Related Art

Enterprises store data in various types of data stores such as relational databases, object-oriented databases, graph databases, document-oriented databases and so on. A large amount of data is stored in non-distributed database (e.g., centralized databases), such as traditional Structured Query Language (SQL) databases. Some database management systems (DBMSs) for such non-distributed databases represent transactions using a declarative query language (e.g., SQL), and maintain the "ACID" properties for transactions (i.e., atomicity, consistency, isolation, and durability).

However, there is an increase in using distributed databases to store data. An example of such distributed databases includes NoSQL databases, such as document-oriented databases, key-value stores, and graph databases. Due to the distributed nature of these databases, executing transactions which maintain the ACID properties (atomicity, consistency, isolation, durability) and provide effective performance is challenging. Conventional distributed database systems employ complex, resource-intensive, and time-consuming measures to manage transaction execution in a manner that maintains the ACID properties of transactions, such as to avoid conflicts or ensure failed transactions are resolved. These conventional measures include using a centralized transaction coordinator (e.g., central server, manager, or transaction log) or expensive locking operations (e.g., database-level locks). As such, improved techniques for managing transaction execution in distributed databases are needed.

SUMMARY

Client systems of a distributed database system manage execution of transactions on data stored within the distributed database system. The client systems communicate directly with database nodes of the distributed database system in order to manage transactions, such as reading, mutating, or inserting records (e.g., relational tables or documents) at the distributed database nodes. The client systems interact with the database nodes of the distributed database system via a client-side interface that performs various operations to execute transactions at the distributed database nodes, including retrieving records, staging mutations or insertions, committing mutations or insertions, or rolling back mutations or insertions on records stored on the distributed database nodes. Interactions between the client-side interface and the database nodes of the distributed database system are further configured to prevent conflicts between different transactions executed by the same or different client systems at the database nodes.

In some embodiments, the client systems prevent transaction conflicts in the distributed database system using information stored by the database nodes for individual records. The information stored by the database nodes for a record may include a check and set (CAS) value that updates after the record is modified (e.g., due to a mutation being staged). A client system accessing a record to execute a transaction receives a CAS value for the record and uses this CAS value to attempt to stage a mutation for the record at a database node storing the record. If the CAS value does not match a current CAS value for the record at the database node, the client system may abort execution of the transaction or otherwise prevent a conflict. As another example, the information stored by the database nodes for a record may include staged mutations for the record. In this case, a client system accessing a record to execute a transaction may identify a staged mutation for the record corresponding to a different transaction and abort execution of the transaction or otherwise prevent a conflict.

In some embodiments, the client systems resolve partially executed transactions that could not be completed on the database nodes, referred to as lost transactions. The client systems may monitor the database nodes to identify lost transactions. In particular, the client systems of the distributed database system may share in a distributed transaction cleanup process. The client systems may identify lost transactions using Active Transaction Records (ATRs) describing transactions executed on the database nodes of the distributed database. If a client system identifies a lost transaction, the client system may take appropriate remedial action to resolve the lost transaction depending on the state of the failed transaction.

DETAILED DESCRIPTION

System Environment

Figure 1:
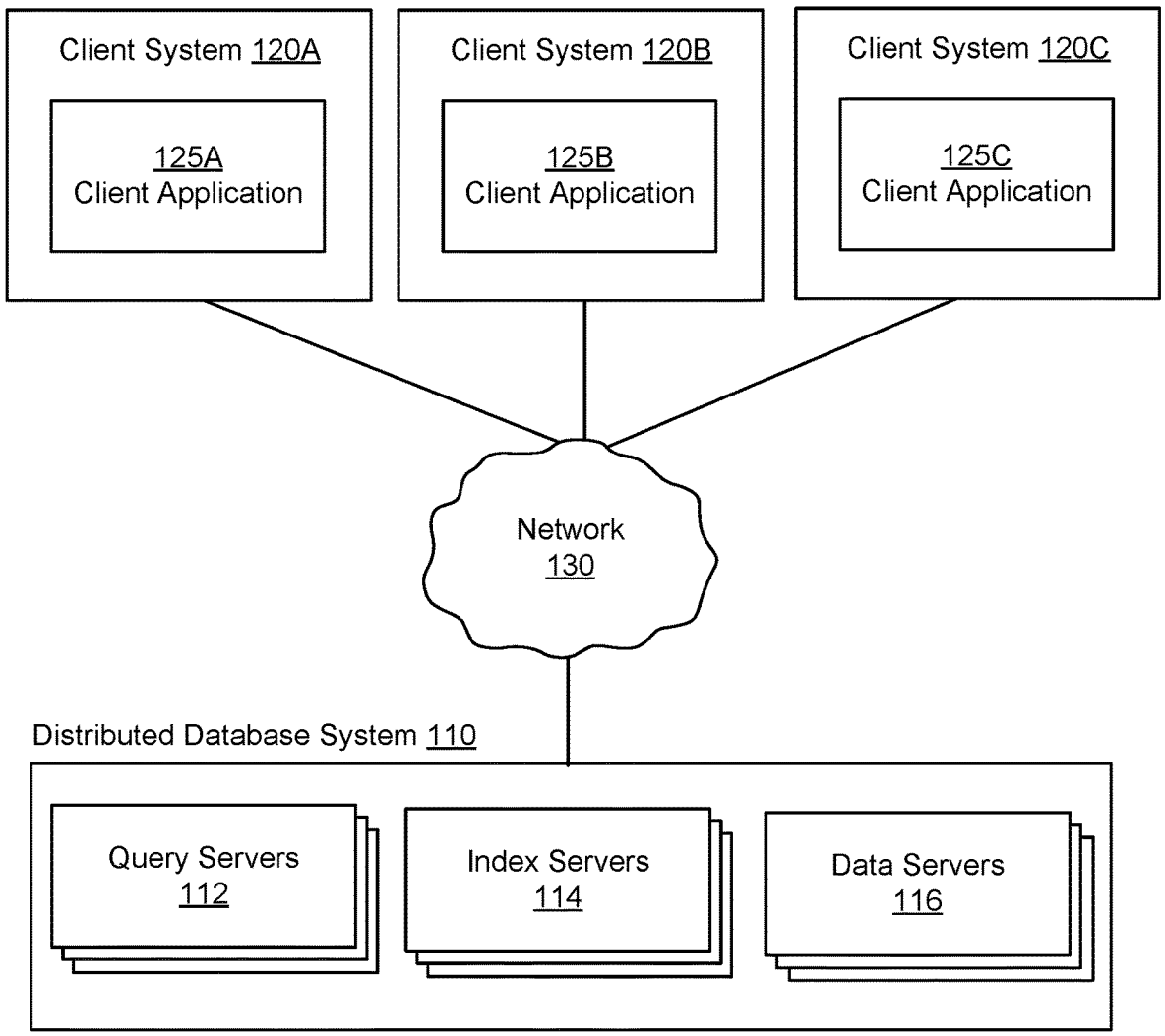
FIG. 1 is of a block diagram of a distributed database system environment for performing transactions, according to an embodiment.

FIG. 1 is an embodiment of a block diagram of system environment 100 for distributed processing of transactions for a distributed database system. In the embodiment shown, the system environment 100 includes a distributed database system 110, client systems 120, and a network 130. Other embodiments may use more, fewer, or different systems than those illustrated in FIG. 1. Functions of various modules and systems described herein can be further implemented by modules or systems other than those described herein.

The distributed database system 110 manages a distributed database. The distributed database system 110 includes a set of distributed database nodes including distributed query servers 112, distributed index servers 114, and distributed data servers 116. The distributed database nodes may be individual servers or server clusters, virtual database nodes distributed to one or more physical servers, or some combination thereof. The distributed database system 110 enables the client systems 120 to execute transaction on data stored in the data servers 116 via communication with one or more components of the distributed database system 110. In an exemplary embodiment, the client systems 120 execute transactions by communicating directly with the data servers 116, as described in greater detail below with reference to the client systems 120 and FIG. 2. Although FIG. 1 shows a single element, the distributed database system 110 broadly represents a distributed database including the distributed query servers 112, the index servers 114, and the data servers 116 which may be located in one or more physical locations. The individual elements of the distributed database system 110 may be any computing device, including but not limited to: servers, racks, workstations, personal computers, general purpose computers, laptops, Internet appliances, wireless devices, wired devices, multi-processor systems, mini-computers, cloud computing systems, and the like. Furthermore, the elements of the distributed database system 110 depicted in FIG. 1 may also represent one or more virtual computing instances (e.g., virtual database nodes), which may execute using one or more computers in a datacenter such as a virtual server farm. As such, the query servers 112, index servers 114, and data servers 116 may each represent one or more database nodes, such as one or more virtual database nodes, executed on one or more computing devices.

The query servers 112 facilitate queries on the distributed database. In particular, the query servers 112 may process query statements received from the client systems 120 represented using one or more query languages (e.g., structured query language (SQL), GraphQL, non-first normal form query language (N1QL), etc.). The query servers 112 may generate query execution plans (QEPs) using received query statements. QEPs may be generated using various techniques, such as those described in co-pending U.S. patent application Ser. No. 16/785,499, filed Feb. 7, 2020, which is incorporated herein by reference in its entirety. In some embodiments, the query servers 112 facilitate execution of transactions including one or more statements represented using a declarative query language, such as by using any of the methods described in co-pending U.S. patent application Ser. No. 17/007,561, filed Aug. 31, 2020, which is incorporated herein by reference in its entirety.

The index servers 114 manage indexes for data stored in the distributed database system 110. In various embodiments, the index servers 114 can receive requests for indexes (e.g., during execution of a transaction) from the query servers 112, directly from the client system 120, or some other element of the system environment 100. The index servers 114 can generate indexes for one or more fields of records stored by the data servers 116. Indexes stored by the index servers can include B-tree indexes, inverted tree indexes, hash indexes, R-tree indexes, GIST indexes, or any other suitable type of database index. The index servers 114 may automatically generate or update indexes for one or more records stored in the data server 116 based on transactions performed by the distributed database system 110. Additionally, or alternatively, the index servers 114 may automatically generate or update indexes for one or more records stored in the data server 116 based on a request (e.g., an instruction associated transaction) received from another component of the distributed database system 110 (e.g., the query servers 112). In some embodiments, a given index server of the index servers 114 manages indexes stored on a corresponding index storage server or server cluster. In the same or different embodiments, a given index server of the data servers 116 manages indexes stored locally on the given data server. As described above with reference to the distributed database system 110, an index server 114 may be a virtual database node executed on one or more computing devices (e.g., a server computer or server cluster), where each of the one or more computing devices can include one or more virtual database nodes.

The data servers 116 manage data organized into records in a distributed database of the distributed database system 110. In various embodiments, the data servers 116 can provide requested data to other elements of the system environment 100 (e.g., the query servers 112) and store new or modified data in the distributed database. In particular, the data servers 116 can commit new or modified data to the distributed database in response to receiving instructions to execute corresponding transactions directly from the client systems 120. In processing instructions to execute transactions, the data servers 116 maintain the ACID properties of transactions (atomicity, consistency, isolation, and durability). The distributed database may be one of various types of distributed databases, such as a document-oriented database, a key-value store, a graph database, a relational database, a wide-column database, or a search index. Similarly, records storing data in the distributed database of the distributed database system 110 may be represented using various formats or schemas based on the type of database used, such as relational tables or documents (e.g., JavaScript Object Notation (JSON) or XML documents). In some embodiments, a given data server of the data servers 116 manages data stored on a corresponding data storage server or server cluster. In the same or different embodiments, given data server of the data servers 116 manages data stored locally on the given data server. As described above with reference to the distributed database system 110, a data server 116 may be a virtual database node executed on one or more computing devices (e.g., a server computer or server cluster), where each of the one or more computing devices can include one or more virtual database nodes.

In an exemplary embodiment, in order to maintain the ACID properties in committing a transaction, the data servers 116 maintain Active Transaction Records (ATRs) which describe transactions actively being executed by one or more client systems 120. ATRs include individual entries for each active transaction describing a state of the active transactions. In particular, ATR entries may include a transaction state (e.g., "pending," "committed," "aborted," etc.), a transaction identifier (e.g., a unique identifier), information identifying one or more relevant records stored by the data servers 116, or any other relevant information. The ATRs are accessible to the client systems 120 in order to provide awareness to the client system 120 of other transactions being executed, e.g., to prevent transaction conflicts from occurring. Furthermore, the data servers 116 maintain data associated with individual records referred to as virtual attributes that are usable to stage modifications of the records. Similarly to the ATRs, the virtual attributes of each record are accessible to the client systems 120 in order to provide awareness of whether a record is being modified by another active transaction. In some embodiments, virtual attributes of records are only visible if specifically requested (e.g., by a client system 120). Staged modifications in the virtual attributes of a record can include an identifier of a transaction corresponding to the modification, such as an identifier of an entry for the transaction in an ATR. ATRs may be represented or stored using various methods, such as JSON.

Records stored in the data servers 116 may include or otherwise be associated with information allowing a first client system 120 (e.g., the client system 120A) to determine whether a record has been modified by a second client system 120 (e.g., the client system 120B) during execution of a transaction by the second client system 120. This information may be stored, for example, in the virtual attributes of a record. In particular, a record can be associated with a check-and-set (CAS) value which is received by a client system 120 when reading the virtual attributes of a record. The CAS value for the virtual attributes for a record is updated each time the record is modified, such as due to a mutation being staged in the virtual attributes of the record. As such, a client system 120 or the data servers 116 can prevent write-write transaction conflicts by determining whether a CAS value for the virtual attributes of a record changes between the time the CAS is first received and the client system 120 attempts to modify the virtual attributes (e.g., to stage new modifications). Performing commits of new or modified data to the distributed data servers 116 which maintain the ACID properties of transactions, and particularly using ATRs and virtual attributes, is described in greater detail below with reference to FIGS. 2-9.

In some embodiments, the data servers 116 organize data according to one or more levels of granularity. In an exemplary embodiment, the data servers 116 group records into a first level of granularity referred to as collections, such as a collection of records representing a type of data object (e.g., a collection "user" objects). Similarly, the data servers 116 group collections into a second level of granularity referred to as a scope and group scopes into a third level of granularity referred to as bucket, where a bucket represents an overall database for a client system. Other levels of granularity may correspond to individual database nodes (e.g., individual data servers 116). Other embodiments may include additional or fewer levels of granularity. Additionally, some or all of the levels of granularity for organizing data may be optional. For instance, the data servers 116 may organize all data into buckets by default, and organization using scopes or collections may be optional or otherwise configurable.

In some embodiments, the distributed database system 110 partitions a group of records at some level of granularity (e.g., a bucket) into multiple virtual groups (e.g., a virtual bucket) distributed across multiple data servers 116. In doing so, records in the same group can be stored on different physical data servers 116. The distributed database system 110 may assign records in the group to individual virtual groups using various techniques, such as a hashing algorithm.

In some embodiments, the data servers 116 include one or more groups of records referred to as a system collection that include metadata for the distributed database system 110. In particular, the data servers 116 or the client systems 120 may use the systems collection to store metadata for transactions executed in the distributed database system 110.

The data servers 116 may include multiple copies of data (e.g., redundant backup copies) distributed across multiple data servers 116. In this case, copies of data on an active data server 116 may be used for client read and write operations on the data with redundant copies of the data on one or more other data servers 116. After modifications are made to data stored on the active data server 116 (e.g., mutations or insertions), the distributed database system 110 propagates the modifications to the redundant copies on the one or more other data servers.

The client systems 120 (e.g., the client systems 120A, 120B, or 120C) are client computing systems that communicate with the distributed database system 110 to execute transactions. The client system 120 may include one or more computing devices, such as personal computers (PCs), mobile phones, server computers, etc. The client systems 120 each include a client application 125 (e.g., the client applications 125A, 125B, and 125C) that communicates with the distributed database 110, such as by using one or more interfaces of the distributed database system 110. For instance, the distributed database system 110 might provide an application programming interface to facilitate communication with the client systems 120, such as a Representational State Transfer (REST) API. In an exemplary embodiment, the client systems 120 communicate directly with the data servers 116 using the client applications 125 to execute transactions on data stored on the data servers 116. The transactions can be represented using a programming language that one or both of the client applications 125 and an API of the distributed database system 110 are configured to use. In the same or different embodiments, the transactions can include statements represented using other formats, including a declarative programming language, procedural query language, or other type of query language used by the distributed database system 110.

In embodiments, the client systems 120 communicates with the distributed database system 110 to execute transactions in the distributed database. The transactions may be generated by the client systems 120 via the client applications 125 or other processes executing on the client system 120. Furthermore, the client systems 120 can receive data from the distributed database system 110, such as data requested in a transaction. In an exemplary embodiment, the client systems 120 execute transactions by communicating directly with one or more of the data servers 116. In the same or different embodiments, the client systems 120 communicate with other components of the distributed database system 110 to execute transitions, such as the query servers 112 or the index servers 114. As an exemplary case, transactions executed by the client systems 120 may make modifications to existing records stored by the data servers 116 (i.e., mutations), may add new records for storage in the data servers 116 (i.e., insertions), or may remove records from storage in the data servers 116 (i.e., deletions). Furthermore, although techniques for executing transactions are described herein primarily in relation to mutations and insertions, one skilled in the art will appreciate that other database operations are possible using the same or similar techniques, such as deletions.

In some embodiments, the client application 125 of a client system 120 communicates with the distributed database system 110 via software integrated with a software development kit (SDK) on the client system 120. For instance, the SDK may be an SDK configured for executing transactions at the distributed database system 110. In this case, the client application 125 may execute transactions at the distributed database system 110 using software tools provided by the SDK, such as transaction execution functions, user defined functions, or eventing functions (e.g., Couchbase Eventing Functions). The SDK may be implemented using any suitable programming language (e.g., Java, C++, Python, etc.). The SDK may provide an application programming interface (API) to the client application 125 for executing transactions or otherwise performing operations at the distributed database system 110. Alternatively, or additionally, the client applications 125 may communicate directly with the distributed database system 110 via the same or different API.

The interactions between the client systems 120 and the distributed database system 110 are typically performed via a network 130, for example, via the Internet or via a private network. In one embodiment, the network uses standard communications technologies or protocols. Examples of networking protocols include the transmission control protocol/Internet protocol (TCP/IP), the user datagram protocol (UDP), internet control message protocol (ICMP), etc. The data exchanged over the network can be represented using technologies and/or formats, including JSON, the hypertext markup language (HTML), the extensible markup language (XML), etc. In another embodiment, the entities can use custom or dedicated data communications technologies instead of, or in addition to, the ones described above. The techniques disclosed herein can be used with any type of communication technology, so long as the communication technology supports receiving a web request by the distributed database system 110 from a sender, for example, a client system 120, and transmitting of results obtained by processing the web request to the sender.

Figure 2:
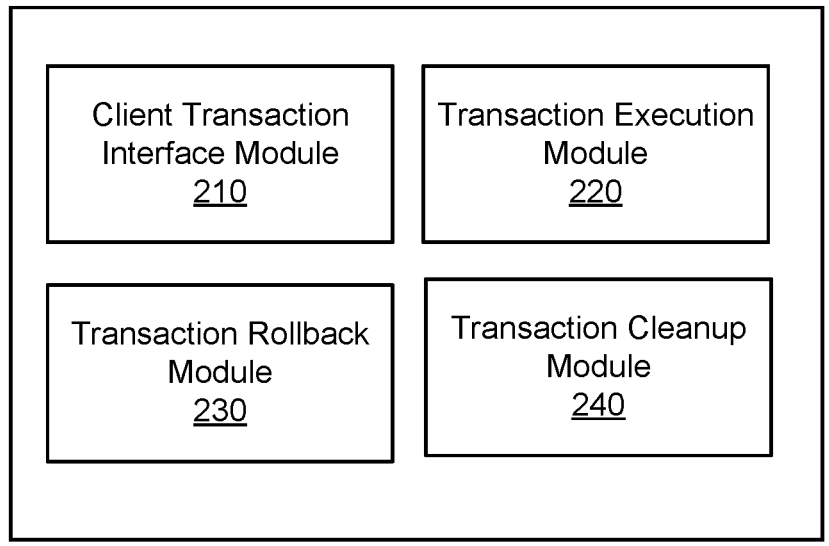
FIG. 2 is a block diagram of a client application, according to an embodiment.

FIG. 2 is a block diagram of an embodiment of a client application 200. The client application may be an embodiment of one of the client applications 125. In the embodiment shown, the client application 200 includes a client transaction interface module 210, a transaction execution module 220, a transaction rollback module 230, and a transaction cleanup module 240. In other embodiments, the client application 200 may include different or additional components than those shown in FIG. 2. Furthermore, some or all of the operations described for the client application 200 may be performed by other components of a client system 120, or another suitable computing system or device.

The client transaction interface module 210 facilitates communication between the client application 200 and data servers 116 of the distributed database system 110. In particular, the client transaction interface module 210 provides an interface to the client application 200, such as an API, that enables the client application 200 to provide instructions to the transaction execution module 220 for transactions at one or more data servers 116, as described in greater detail below with reference to the transaction execution module 220. The client transaction interface module 210 may be a component of an SDK of the distributed database system 110 included in the client application 200, as described above with reference to the client application 125.

The interface provided by the client transaction interface module 210 is configured to receive transactions represented using a set of instructions corresponding to the interface provided by the client transaction interface module 210. For instance, the set of instructions may include calls to functions of the interface provided by the client transaction interface module 210, such as API functions or other mechanisms for providing instructions through software programs or routines. The set of instructions may include instructions corresponding to different operations in the process of executing a transaction, such as instructions configured to execute mutations (retrieving data, modifying mutations of retrieved data, staging mutations, committing mutations, removing data, etc.), execute insertions (e.g., staging inserted data, committing inserted data, etc.), rollback a transaction execution attempt (e.g., responsive to some step of the transaction execution failing), or perform any other operations relevant to executing a transaction at the data servers 116. By enabling the client application 200 to submit transactions using the set of instructions corresponding to the interface provided by the client transaction interface module 210, the client transaction interface module 210 advantageously offloads complex logic relating to executing transactions that maintain the ACID properties from the client application 200. As such, developers of the client application 200 do not need to configure the client application to handle this logic themselves.

In an exemplary embodiment, the client transaction interface module 210 receives transactions represented using lambda functions from the client application 200. The lambda functions may be represented using any programming language that the interface of the client transaction interface module 210 is configured to process. A lambda function representing a transaction includes instructions from a set of API instructions corresponding to an API provided by the client transaction interface module 210. The lambda function may also include custom instructions, such as instructions configured to process an intermediate result of the execution of the transaction, such as data retrieved from a data server 116 during execution of the transaction, data derived from data retrieved from a data server 116 during execution of the transaction, or data that is otherwise used during execution of the transaction. The custom instructions may further interact with one or more other components of the client application 200 or the client device 120 including the client application 200. The custom instructions may be configured by a developer of the client application 200 or generated by the client application 200. In other embodiments, the client transaction interface module 210 is configured to execute transactions that custom instructions represented using other techniques than a lambda function, such as using various data structures or file formats.

By receiving transactions represented using lambda functions, the client transaction interface module 210 advantageously enables the client application 200 to intermingle custom operations with transaction execution operations. In contrast, conventional distributed database systems process transactions by receiving an entire representation of a transaction (e.g., a list of data manipulation commands) from a client system at a remote processing point (e.g., a central transaction coordinator). In such cases, the remote processing point remotely executes the transaction on the distributed database based on the received representation. As such, these conventional systems are constrained to only executing logic specific to the transaction during execution on the remote system. Such undynamic remote processing of transactions prevents clients from performing custom operations during execution of a transaction, as is enabled by the techniques described above. As an example, such custom operations may include using external software libraries (e.g., a library that implements machine learning functionality) that would not conventionally be available during transaction processing. As another advantage, using a lambda function enables general transaction functionality to be handled by the interface corresponding to the distributed database system 110 (e.g., the SDK), simplifying development of transaction generation procedures for client systems (e.g., as implemented by developers of the client applications 125). Additionally, the use of lambda functions to represent transactions enables simplified scaling of transaction processing across client systems in the overall distributed system (e.g., the distributed components of FIG. 1).

The transaction execution module 220 communicates directly with the data servers 116 to execute transactions. For instance, the transaction execution module 220 may execute transactions submitted by the client application 200 through the client transaction interface module 210. As with the client transaction interface module 210, the transaction execution module 220 may be a component of an SDK of the distributed database system 110 included in the client application 200. The transaction execution module 220 may execute instructions received from the set of functions of the client transaction interface module 210, such as instructions for performing different operations in the process of executing a transaction. Overall the transaction execution process is divided into two stages: a pending stage during which record mutations or insertions described by a transaction are staged in one or more data servers 116, and a committed stage during which the relevant records are updated to persistently reflect the staged mutations or insertions (e.g., in the body of the record). During the pending stage, staged mutations or insertions for a transaction being executed may be rolled back, as described in greater detail below with reference to the transaction rollback module 230. However, after a transaction enters the committed stage, the staged modifications cannot be rolled back and the transaction is considered to be logically committed even if the individual records have not yet been updated to persistently reflect the staged mutations or insertions. As such, entities accessing a record (e.g., the client systems 120) with a staged mutation or insertion corresponding to a transaction that has entered the committed stage uses the staged data rather than the data in the body of the record.

In an exemplary embodiment, in order to execute a transaction, the transaction execution module 220 generates an ATR entry for the transaction in an ATR stored by the data servers 116, as described above with reference to data servers 116, which provides visibility of the state of the transaction to other client systems 120 executing transactions on the distributed database system 110. The transaction execution module 220 updates the ATR entry throughout execution of the transaction to reflect a changing state of the transaction. The transaction execution module 220 initially sets a transaction state in the ATR entry for a transaction to "pending" to indicate that the transaction is in the pending stage, such as if mutations or insertions described by the transaction have not all been staged.

Continuing with the exemplary embodiment, if the transaction execution module 220 successfully stages the entire transaction (e.g., by staging all of the mutations or insertions described by the transaction), the transaction execution module 220 sets the transaction state to "committed" to indicate that the transaction is in the committed stage. The "committed" transaction state in the ATR entry for the transaction conveys to entities accessing records relevant to the transaction that the staged mutations or insertions described by the transaction will eventually be committed to the data servers 116 (e.g., by the transaction execution module 220 or the transaction cleanup module 240 of some client system 120, as described below) even if they have not yet each been committed. As such, a client system 120 that encounters a record having staged mutations corresponding to a transaction may retrieve the ATR entry for the transaction to determine the state of the transaction. In this case, if the transaction is in the pending stage, then the client system 120 uses the persistent record data stored in the record body. Alternatively, if the transaction is in the committed stage, then the client system 120 instead uses the staged mutation data for the record.

Continuing with the exemplary embodiment, if the transaction execution module 220 fails to successfully stage the entire transaction, the transaction execution module 220 sets the transaction state to "aborted." Insertions or mutations previously staged by the transaction execution module 220 during execution of the transaction may additionally, or alternatively, be rolled aback by the transaction rollback module 230, as described in greater detail below. The transaction execution module 220 may fail to successfully stage a transaction for various reasons. For example, the transaction execution module 220 may access a record having staged mutations corresponding to some other transaction, e.g., being executed by some other client system 120, or due to a failure of one or more of the data servers 116 (e.g., a server crash) or other components of the distributed database system 110.

After aborting a transaction execution attempt, the transaction execution module 220 may reattempt executing the transaction one or more times. For instance, transactions may be associated with expiration times, and the transaction execution module 220 may reattempt executing a transaction if the transaction has not expired. Alternatively, or additionally, the transaction execution module may reattempt executing a transaction a threshold number of times (e.g., one reattempt, two reattempts, etc.). The transaction execution module 220 may generate a new ATR entry for each transaction execution reattempt, or alternatively reuse the ATR entry generated during the initial transaction execution attempt. In some embodiments, the transaction execution module 220 may delay transaction execution reattempts by a time period in order to prevent a live lock from occurring due to concurrent transaction execution attempts repeatedly failing at the same points. For example, a live lock could occur if client system 120A attempts to stage mutations in records A,B and C in that order, and client system 120B concurrently attempts to stage mutations in records A, B, and C in the opposite order. In particular, client system 120A could successfully stage mutations in records A and B and then try to stage a mutation in record C after client system 120B has staged a mutation and, responsive to identifying a conflict, attempt to rollback the mutations to records A and B. However, before rolling back the mutations to record B the client system 120B may attempt to stage a mutation for record B and also identify a conflict. Both client system 120A and 120B retry executing their respective transactions, and could continue looping without either making progress, e.g., until both transactions. By delaying transaction execution reattempts by non-uniform time periods (e.g., a randomized time period), the transaction execution module 220 can prevent such live lock scenarios. In other embodiments, the transaction execution module 220 may enforce that executions on records stored in the distributed database system 110 by different client systems 120 are all executed on the records in the same order.

Continuing with the exemplary embodiment, after the transaction state is set to "committed," the transaction execution module 220 may attempt to commit the individual staged mutations or insertions by updating the relevant records to persistently reflect the staged mutations or insertions (e.g., by updating the body data of the records). Given that the staged data will be used by any entity accessing a record with a staged mutation or insertion after the transaction enters the committed stage, the individual staged insertions or mutations do not necessarily need to be committed immediately after the transaction enters the committed stage. As such, the transaction execution module 220 may continuously or periodically commit the individual staged mutations or insertions for the transaction over some period of time after the transaction has entered the committed stage. Additionally, or alternatively, one or more other client systems 120 may attempt to commit some or all of the individual insertions or mutations for the transaction (e.g., via their respective transaction execution modules 220). After all individual mutations or insertions for the transactions are successfully committed during the committed stage, the transaction execution module 220 sets the transaction state to "completed." If the transaction execution module 220 fails to commit each of the staged mutations or insertions during the committed stage (e.g., due to one or more of the failure cases identified above), the transaction execution module 220 may reattempt to commit the staged mutations or insertions one or more times. If the transaction execution module 220 cannot reattempt committing the staged mutation or insertions after a failure, such as if the transaction has expired or the transaction execution module 220 has exhausted a reattempt limit, the partially committed transaction may be committed by the transaction cleanup module 240 of the same or different client system 120, as described in greater detail below.

In some embodiments, the transaction execution module 220 verifies that an individual committed mutation or insertion for a transaction has achieved a threshold level of durability at the data servers 116 before committing another individual staged mutation or insertion for the transaction. A level of durability, as used herein, refers to how durable data stored in the distributed database system 110 is to various system failures. For instance, levels of durability may include data being written in memory on a majority of replica database nodes, persisted on disk on a majority of replica database nodes, or written in-memory on the majority of replica database nodes and persisted to disk on an active database node. The particular level of durability used by the transaction execution module 220 may be configured by the application 200, e.g., by providing instructions through the client transaction interface module 210.

The transaction execution module 220 may select an ATR in which to generate an ATR entry for a transaction using a variety of techniques. In some cases, the transaction execution module 220 selects an ATR corresponding to a record that is mutated or inserted by a transaction, such as an ATR corresponding to the first of one or more records mutated by the transaction. In particular, the data servers 116 may store ATRs according to levels of granularity, such as an ATR for each collection, each scope, each bucket, each virtual bucket, or some combination thereof. In this case, an ATR corresponding to a record may be the ATR for a group at some level of granularity that includes the record, such as the virtual bucket including the record.

In some embodiments, the transaction execution module 220, the transaction execution module 220 uses a CAS value for a record to prevent staging mutations that conflict with mutations of another transaction executed by the same or different client system or other entity. As an exemplary case, the transaction execution module 220 may identify the CAS value for a record after retrieving the record from a data server 116 to stage a mutation for the record. The transaction execution module 220 may attempt to stage the mutation using the identified CAS value, such as by providing the identified CAS value to the data server 116. If the provided CAS value does not match a current CAS value for the record at the data server 116, such as due to another mutation being staged for another transaction between the identification of the CAS value and the staging attempt, the data server 116 may reject the attempt to stage the mutation. If the attempt to stage the mutation is rejected, the transaction execution module 220 may abort the transaction execution attempt.

In the same or different embodiments, the transaction execution module 220 stages a mutation of a record described by a transaction using the virtual attributes corresponding to the record, which are described above with reference to the data servers 116. In this case, the transaction execution module 220 may check the virtual attributes of a record retrieved from a data server 116 to determine if the virtual attributes of the record include any conflicting staged mutations corresponding to other transactions. If the transaction execution module 220 determines that there are no conflicting staged mutations, the transaction execution module attempts to stage the mutation in the virtual attributes of the record at the data server 116 (e.g., using a CAS value of the record, as described above). If the transaction execution module 220 instead determines that there are conflicting staged mutations, the transaction execution module 220 may abort execution of the transaction or otherwise perform actions to avoid a conflict. In some embodiments, mutations staged in the virtual attributes of a record may include information identifying an ATR entry of a transaction corresponding to the mutation. In this case, the transaction execution module 220 may use the ATR entry to determine if mutations staged for a record corresponding to a different transaction conflict with a transaction being executed, such as by checking whether the transaction is in a "pending," "committed," or "aborted" state. The transaction execution module 220 may also store information associated with the expected duration of time a transaction is allowed to complete in the ATR entry (e.g., an "expiration window"). These additional attributes allow other parts of the system to recover the transaction attempt to a state even if the initial transaction execution module stops execution unexpectedly owing to a system crash, power failure, etc. In various cases, ATR entry may further include other information, such as debugging information, a unique transaction or transaction execution attempt identifier, performance profiling information, or a durability level configuration.

After the transaction state enters the committed stage, entities accessing a record having a mutation staged in its virtual attributes use the mutation data rather than any data stored in the persistent data of the record (e.g., the record body). For instance, the data servers 116 may be configured to automatically provide an entity accessing the record the data in the virtual attributes of the record rather than the persistent data of the record. Alternatively, or additionally, one or more components of the application 200 (e.g., an SDK associated with the distributed database system 110) accessing a record stored on the data servers 116 may be configured to select the data in the virtual attributes of the record rather than the persistent data of the record to provide to another component of the application 200.

The transaction execution module 220 commits a mutation staged in the virtual attributes of a record by modifying the data stored in the record body to reflect the staged mutation. The transaction execution module 220 may further remove the mutation or any information corresponding to the transaction being executed from the virtual attributes of the record at a same or different time as committing the mutation to the record.

In some embodiments, the transaction execution module 220 stages an insertion of a record described by a transaction using a hidden record that is invisible to any entity accessing data stored by the data servers 116 (e.g., the client systems 120) unless an entity specifically requests to see hidden records. For example, a hidden record within a collection of records would not be retrieved in a query for the collection unless hidden records are specifically requested. In alternative embodiments, a hidden record may only be accessible to an entity having information that particularly identifies a hidden record, such as a unique identifier. As with non-hidden records, hidden records can include virtual attributes containing transaction-related data or metadata. A hidden record may store data intended to be inserted into the distributed database system 110 for a transaction in a main body of the hidden record, or may store the data intended to be inserted in virtual attributes of the hidden record. After the transaction state enters the committed stage, hidden records are no longer invisible to entities accessing data stored in the data server 116 that include the hidden records. As with mutations staged using virtual attributes described above, the data servers 116 or one or more components of the application 200 may process the hidden records in order to select the inserted data. (e.g., an SDK associated with the distributed database system 110) accessing a record stored on the data servers 116 may be configured to select the data in the virtual attributes of the record rather than the persistent data of the record to provide to another component of the application 200.

The transaction execution module 220 commits an insertion staged using a hidden record by converting the hidden record to a non-hidden record. Converting a hidden record to a non-hidden record may include generating a separate non-hidden record using data included in the hidden record, or may include changing the hidden record to a non-hidden record. If a separate non-hidden record is generated, the transaction execution module 220 may remove the hidden record from the data servers 116 at some time after generating the non-hidden record.

The transaction rollback module 230 communicates directly with the data servers 116 to rollback partially executed transactions that have not entered the committed stage. For instance, the transaction rollback module 230 may rollback partially executed transaction attempts by the transaction execution module 220 that failed before the commit stage, as described above. As with the client transaction interface module 210, the transaction rollback module 230 may be a component of an SDK of the distributed database system 110 included in the client application 200. The transaction rollback module 230 may execute instructions received from the set of API functions of the client transaction interface module 210, such as instructions to perform rollback operations for a failed transaction execution attempt.

In order to rollback a partially executed transaction, the transaction rollback module 230 removes staged mutations or insertions corresponding to the transaction from the data servers 116. In embodiments where the transaction execution module 220 stages mutations for a transaction in the virtual attributes of a record, the transaction rollback module 230 may rollback the staged mutations by removing the mutations from the virtual attributes. Similarly, in embodiments where the transaction execution module 220 stages insertions for a transaction using hidden records, the transaction rollback module 230 may rollback the staged insertions by removing hidden records from the data servers 116.

The transaction cleanup module 240 resolves partially executed transaction execution attempts that could not be properly resolved by the transaction execution module 220, referred to herein as lost transactions. Lost transactions may be transactions for which reattempts to execute the transaction by the transaction execution module 220 are no longer allowed (e.g., due to the transaction expiring or reattempts having been otherwise exhausted). A transaction execution attempt may become lost during the pending stage, such as if a failure occurs before the transaction execution module 220 can set an ATR entry for the transaction to an "aborted" state or before the transaction rollback module 230 can finish rolling back staged mutations or insertions corresponding to the transaction. Similarly, a transaction execution attempt may become lost during the committed stage, such as if a failure occurs before the transaction execution module 220 can commit all of the staged mutations or insertions for the transaction or before the transaction execution module 220 can set an ATR entry for the transaction to a "completed state."

If the transaction cleanup module 240 identifies a lost transaction that is in a pre-committed state (e.g., pending), the transaction cleanup module 240 may resolve the lost transaction by completing any unresolved tasks corresponding to the transaction. For example, the transaction cleanup module 240 set the ATR entry state to "aborted" (e.g., by instructing the transaction execution module 220 to set the ATR entry state) or to finish rolling back any staged mutations or insertions (e.g., by instruction the transaction rollback module 230 to perform the rollback). Additionally, or alternatively, the transaction cleanup module 240 may reattempt execution of the transaction (e.g., by instructing the transaction execution module 220 to reattempt to execute the transaction). If the transaction cleanup module 240 identifies a lost transaction that is in a post-committed state, the transaction cleanup module 240 attempts to resolve the transaction by committing any remaining staged mutations or insertions corresponding to the transaction (e.g., by instruction the transaction execution module 220 to commit the remaining staged insertions or mutations).

In an exemplary embodiment, the transaction cleanup modules 240 of some or all of the client systems 120 collectively participate in a distributed transaction cleanup process by monitoring the data servers 116 for lost transactions to resolve. For instance, the transaction cleanup module 240 may continuously or periodically poll the ATRs stored on the data servers 116 for ATR entries corresponding to transactions that are expired. In this way, the lost transaction cleanup process can be distributed across the client systems 120.

In some embodiments, the transaction cleanup module 240 monitors the data servers 116 on a periodic polling basis. In this case, if the transaction cleanup module 240 fails to resolve a lost transaction during a particular polling window, the same or different transaction cleanup module 240 may attempt to resolve the lost transaction during a later polling window. This process may continue indefinitely until any lost transactions are resolved. In the same or different embodiments, the transaction cleanup module 240 resolves lost transactions that are discovered by the transaction execution module 220 during an attempt to execute a transaction.

In some embodiments, ATRs stored by the distributed database system 110 are associated with a timestamp derived from a current time localized to a data server 116 containing the ATR for a level of granularity corresponding to the ATR (e.g., database node, a bucket, a scope, a collection, etc.). The timestamp may be derived from metadata of the data servers 116 that reflects a localized time at the data server 116 for the level of granularity. In this case, the transaction cleanup module 240 may use the timestamp associated with an ATR to determine whether an ATR entry in the ATR represents an expired transaction.

In some embodiments, transactions executed in the distributed database system 110 are assigned a universally unique identifier (UUID). For example, each attempt to execute a transaction may be assigned a UUID during generation of an ATR entry for the transaction execution attempt. An ATR entry corresponding to a transaction may be identified in an ATR using the UUID for the transaction or a transaction execution attempt. In other embodiments, transactions executed in the distributed database system 110 are assigned globally ordered identifiers, which convey the order in which transactions assigned to the globally ordered identifiers were executed.

Although the particular terms "pending," "committed," "aborted," and "completed" are used herein to describe particular transaction states, these terms are selected for the purposes of illustration only and any other suitable terms may be used to describe the respective stages of executing a transaction. Furthermore, execution of a transaction may be logically divided into fewer, more, or different stages than those described herein.

Processes for Executing Transactions in Distributed Database

FIGS. 3-6 are sequence diagrams illustrating embodiments of interactions between elements of the system environment 100 for executing transactions in the distributed database system 110. In embodiments other than those shown in FIGS. 3-6, some or all of the steps may be performed by other entities or components. In addition, some embodiments may perform the steps in parallel, perform the steps in different orders, or perform different steps.

Figure 3:
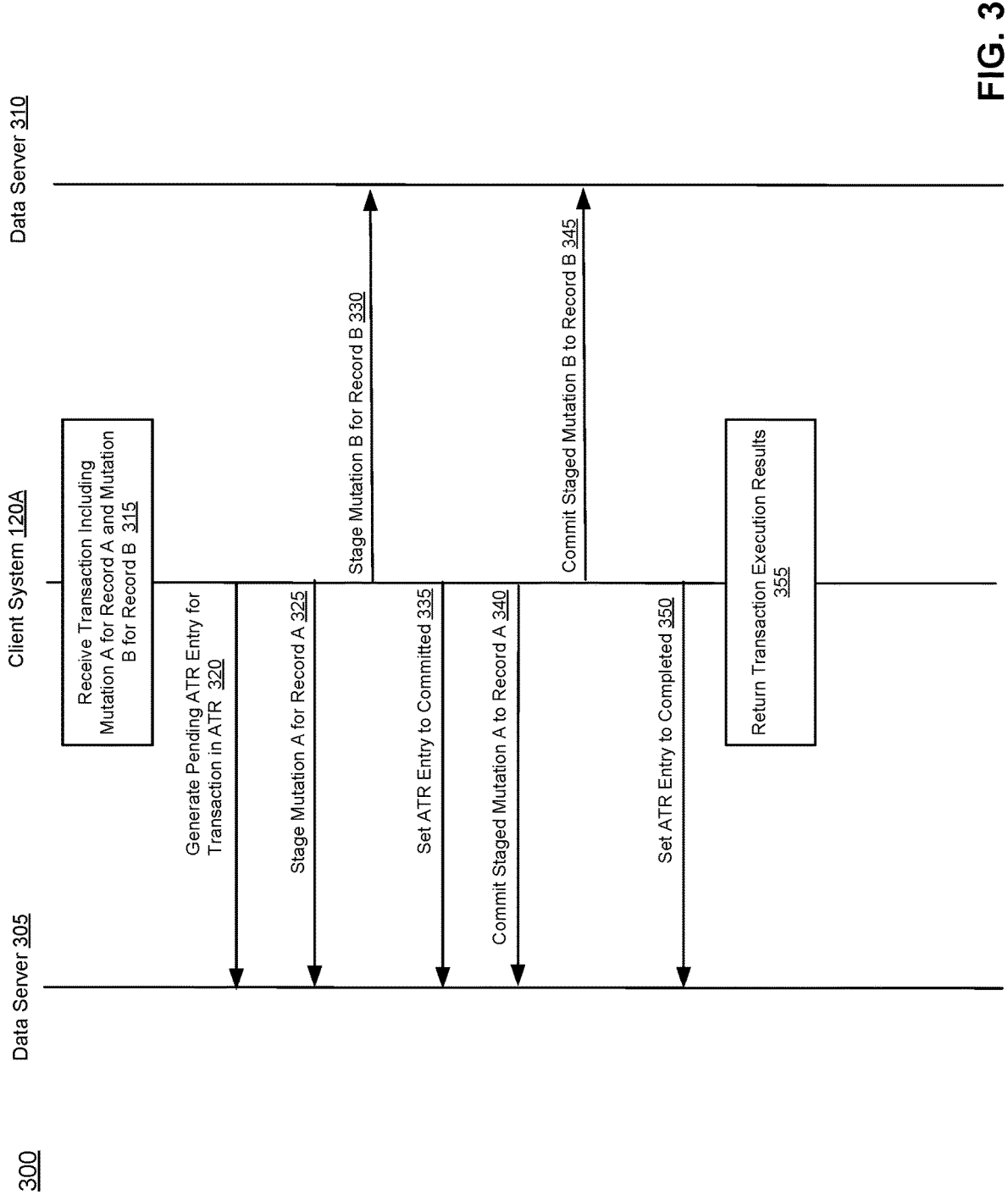
FIG. 3 illustrates a sequence of interactions for executing a transaction describing mutations in a distributed database, according to an embodiment.

FIG. 3 illustrates an embodiment of a sequence of interactions 300 for executing a transaction describing mutations in a distributed database. In the embodiment shown, the sequence of interactions 300 begins with the client system 120A receiving 315 a transaction including a mutation A for a record A and a mutation B for a record B stored on data servers 305 and 310, respectively, such as data servers from the data servers 116. For example, the client application 125A may submit a transaction represented using a lambda function to an SDK associated with the distributed database, as described above with reference to the client transaction interface module 210. In this case, the SDK may execute instructions included in the lambda function to perform the sequence of interactions 300.

After receiving the transaction, the client system 120A generates 320 a pending ATR entry for the transaction in an ATR stored on the data server 305. As depicted in FIG. 3, the ATR entry is added to an ATR stored in the same data server that stores record A. For instance, the client system 120A or distributed database may be configured to select an ATR stored on the same data server as the first mutation of a transaction, as described above with reference to the transaction execution module 220. However, the particular storage location and selection techniques for the ATR within the distributed database may be configured using a variety of techniques, and the data server 305 is used in FIG. 3 for the purpose of illustration only. In step 320, the ATR entry may be set to pending by configuring a field within the ATR entry describing the state of the ATR entry to "pending" or some other information indicative of a pending state.

During the pending stage, the client system 120A stages 325 the mutation A for record A on the data server 305. For example, the client system 120A may stage the mutation A in virtual attributes of the record A, as described above with reference to the transaction execution module 220. The client system 120A further stages 330 the mutation B for record B on the data server 310.

After successfully staging all of the mutations or insertions described by the transaction (e.g., the mutation A, the mutation B, and any other mutations or insertions), the client system 120A sets 335 the ATR entry for the transaction to a committed state. For example, the ATR entry for the transaction may be set to as committed by configuring a field within the ATR entry describing the state of the ATR entry to "committed" or some other information indicative of a committed state.

During the committed stage, the client system 120A commits 340 the staged mutation A to the record A. For example, the client system 120 may update the body of record A to reflect the mutation A. The client system 120A may further remove the mutation A from the location where it was staged, such as virtual attributes of the record A. The client system 120A further commits 345 the staged mutation B to the record B on the data server 310.

After successfully committing all of the individual mutations or insertions described by the transaction, the client system 120A sets 350 the ATR entry for the transaction to a completed state. For example, the ATR entry for the transaction may be set to completed by configuring a field within the ATR entry describing the state of the ATR entry to "completed" or some other information indicative of a completed state.

The client system 120A further returns 355 transaction execution results as a response to the received 315 transaction. For instance, an SDK associated with the distributed database may provide the transaction execution results to the client application 125A. The transaction execution results may include various information, such as information indicating that the transaction was successfully completed, data from one or more records mutated or inserted by the transaction, or other relevant information.

Figure 4:
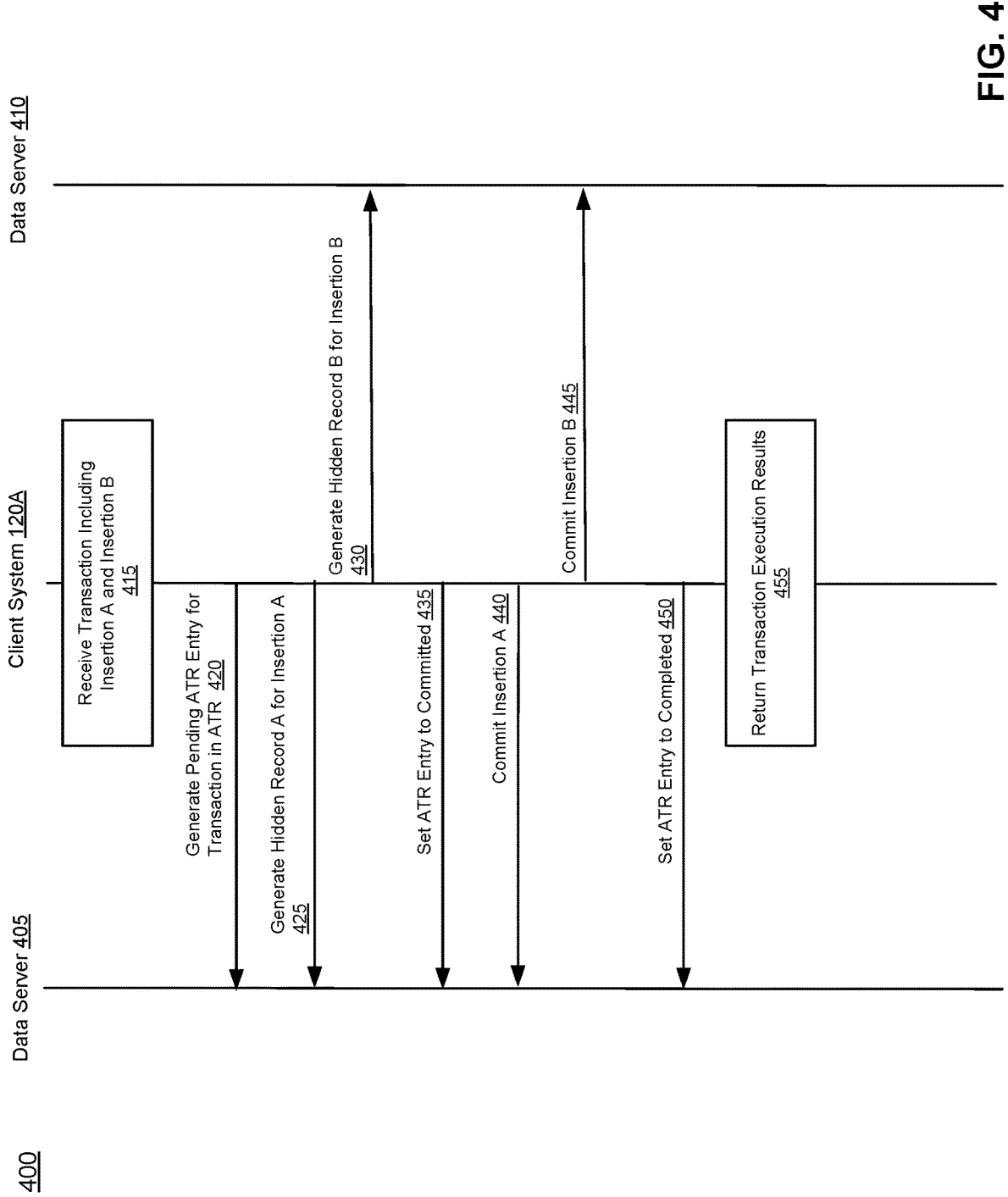
FIG. 4 illustrates a sequence of interactions 400 for executing a transaction describing insertions in a distributed database, according to an embodiment.

FIG. 4 illustrates an embodiment of a sequence of interactions 400 for executing a transaction describing insertions in a distributed database. The sequence of interactions 400 includes many of the same or similar interactions between the client system 120A and data servers 405 and 410 as the sequence of interactions 300 does between the client system 120A and the data servers 305 and 310. However, in the sequence of interactions 400, a transaction received 415 by the client system 120A includes an insertion A and an insertion B, as opposed to a mutation A and mutation B in the sequence of interactions 300. In order to execute the received transaction, the client system 120A generates 425 a hidden record A for the insertion A on the data server 405. Furthermore, the client system 120A generates 430 a hidden record B for the insertion B on the data server 410. For example, the client system 120A may generate hidden records as described above with reference to the transaction execution module 220.

Furthermore, during the committed stage, the client system 120A commits 440 the insertion A to the data server 405 and commits 445 the insertion B to the data server 410. For instance, the client system 120A may convert the hidden records A and B to non-hidden records, as described above with reference to the transaction execution module 220.

Figure 5:
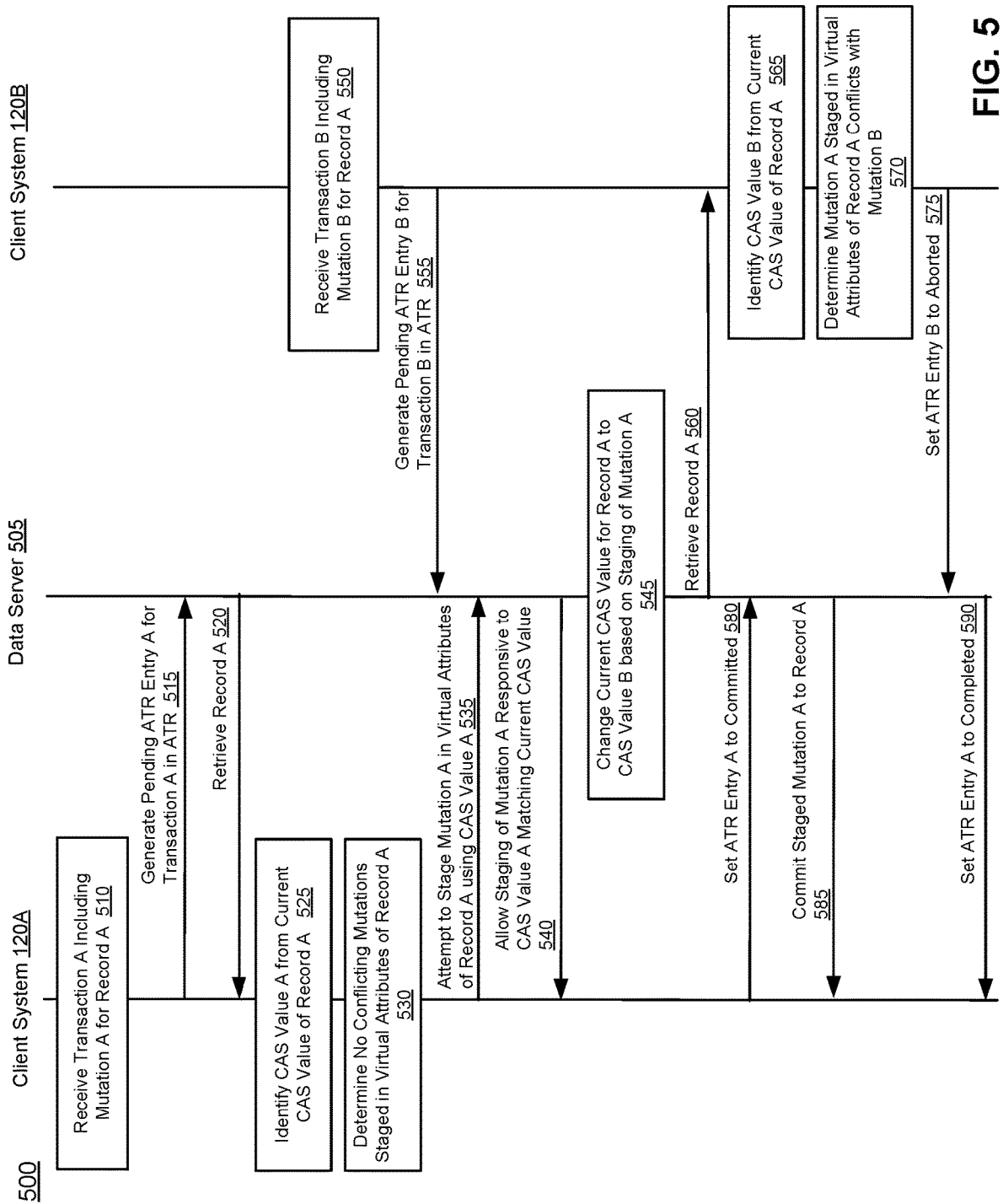
FIG. 5 illustrates a sequence of interactions 500 for preventing transaction conflicts in a distributed database, according to an embodiment.

FIG. 5 illustrates an embodiment of a sequence of interactions 500 for preventing transaction conflicts in a distributed database. In the embodiment shown, the sequence of interactions 500 begins with the client system 120A receiving 510 a transaction A including a mutation A for a record A stored on a data server 505, such as a data server 116. In order to attempt execution of the received transaction A, the client system 120A generates 515 a pending ATR entry at the data server 505.

As part of the attempt to execute the transaction A, the client system 120A retrieves 520 record A from the data server 505. The client system 120 A further identifies 525 a CAS value A from a current CAS value of the record A. For instance, the current CAS value for the record A may be included in virtual attributes of the record A. As another example, the current CAS value for the record A may be provided by the data server 505 to the client system 120A responsive to the client system 120A retrieving 520 the record A.

The client system 120A further determines 530 that there are no conflicting mutations staged in the virtual attributes of the record A. For example, the client system 120A may check the virtual attributes of the retrieved record A for any mutations staged for other transactions by one or more of the client systems 120, as described above with reference to the transaction execution module 220.

Responsive to determining 530 that there are no conflicting mutations, the client system 120A attempts 535 to stage the mutation A in the virtual attributes of the record A using the CAS value A. For example, the client system 120A may stage the mutation A in the virtual attributes of the retrieved record A and provide the retrieved record A back to the data server 505. Alternatively, the client system 120A may provide the mutation A to the data server 505 in a request for the data server 505 to stage the mutation A in the virtual attributes of the record A.

The client system 120A provides the CAS value A to the data server 505 as part of the attempt to stage the mutation A in order for the data server 505 to verify that the CAS value A matches the current CAS value of the record A. Responsive to the CAS value A matching the current CAS value, the data server 505 allows the staging of the mutation A for the record A. For example, the data server 505 may provide a notification to the client system 120A indicating that the attempt to stage 535 was successful. The data server 505 further changes 545 the current CAS value for the record A to the CAS value B based on the staging of mutation A.

Before, after, or during the interactions 510-545, the client system 120B receives 550 a transaction B including a mutation B for the record A. Similarly to the client system 120A at interaction 515, the client system 120B generates 555 a pending ATR entry B for the transaction B in an ATR on the data server 505 (e.g., the same ATR used for the ATR entry A). After the data server 505 changes 545 the current CAS value for the record A to the CAS value B, the client system 120B retrieves 560 the record A. Similarly to the client system 120A at the interaction 525, the client system 120B identifies 565 the CAS value B from the current CAS value for the record A. However, unlike the client system 120A, the client system 120B determines 570 that mutation A staged in the virtual attributes of the record A conflicts with mutation B of transaction B. Responsive to determining 570 the conflict, the client system 120B aborts the attempt to execute transaction B by setting 575 the ATR entry B to an aborted state. The client system 120B may further rollback any staged mutations or insertions corresponding to the transaction B, as described above with reference to the transaction execution module 220 and the transaction rollback module 230. The client system 120B may further reattempt executing the transaction B one or more times, as described above with reference to the transaction execution module 220.

After successfully staging all of the mutations or insertions described by transaction A, the client system 120A sets 580 the ATR entry A to committed, commits 585 the staged mutation A to record A, and sets 590 the ATR Entry A to completed, similarly to the steps 335, 340, and 350 of the sequence of interactions 300. In particular, the client system 120A may commit the staged mutation A to record A by updating a body of record A to reflect the mutation A and removing the staged mutation A from the virtual attributes of record A.

Figure 6:
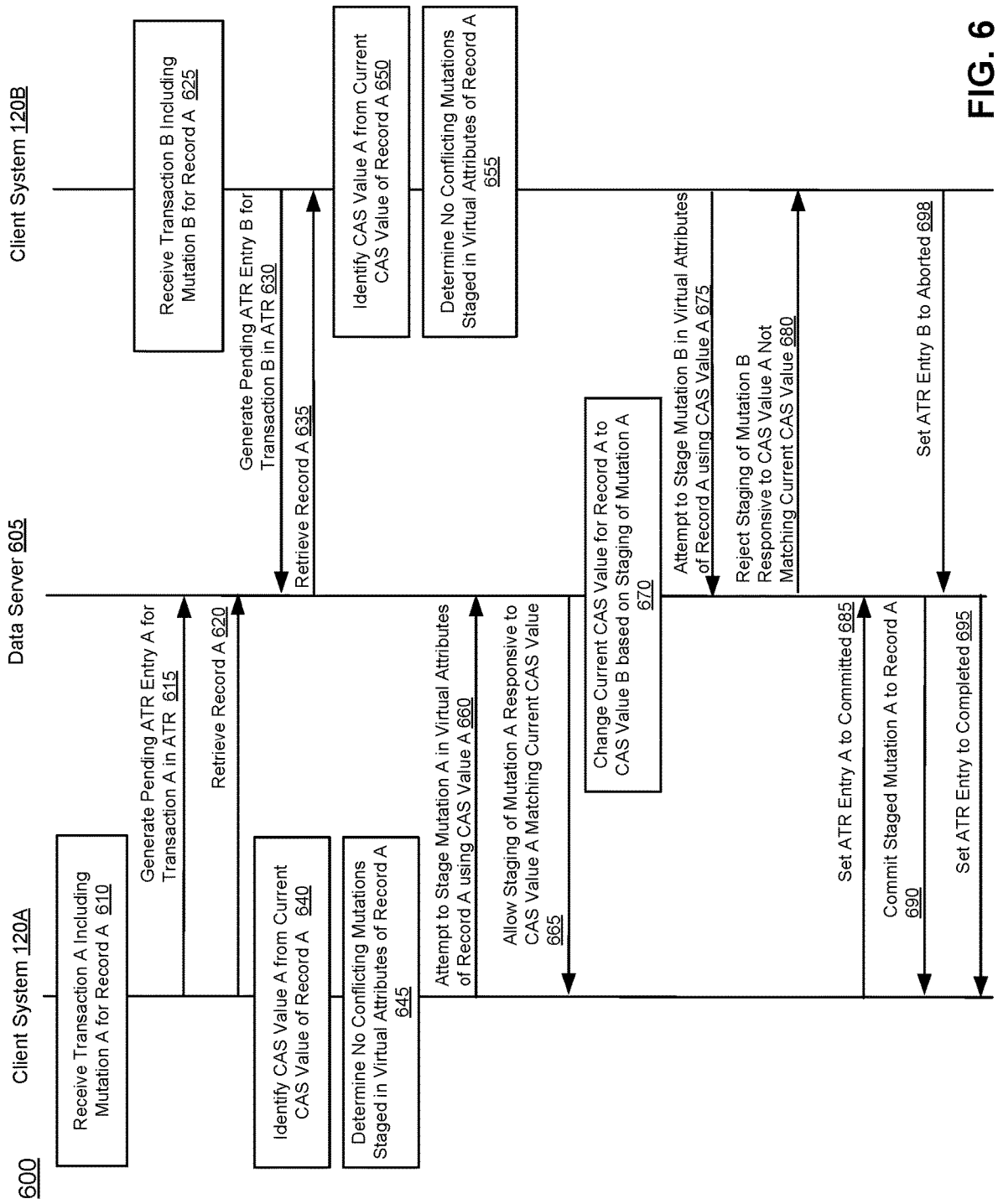
FIG. 6 illustrates a sequence of interactions 600 for preventing transaction conflicts in a distributed database, according to an embodiment.

FIG. 6 illustrates an embodiment of a sequence of interactions 600 for preventing transaction conflicts in a distributed database. The sequence of interactions 600 includes many of the same or similar interactions between the client systems 120A and 120B and data servers 605 as the sequence of interactions 500 does between the client systems 120A and 120B and the data server 505. However, in the sequence of interactions 600, the client system 120B retrieves 635 a record A before the data server 605 allows 540 staging of mutation by the client system 120A. As a first result of this difference, the client system 120B identifies 650 the CAS value A from the current CAS value of record A. This is in contrast with step 565 of FIG. 5 where the client system 120B identifies the CAS value B. As a second result of this difference, the virtual attributes of record A do not include the staged mutation A as retrieved 635 by the client system 120B and as such the client system 120B determines 655 that there are no conflicting mutations tagged in the virtual attributes of record A. This is in contrast with step 570 of FIG. 5 where the client system 120B determines that mutation A conflicts with mutation B.

The sequence of interactions 600 further includes the client system 120B attempting to stage mutation B in the virtual attributes of record A using CAS value A after the data server 605 changes the current CAS value of record A to CAS value B. As a result of the CAS value A not matching the current CAS value of record A, the data server 605 rejects 680 the attempt to stage mutation B. Responsive to the rejection, the client system 120B aborts the attempt to execute transaction B and sets 698 the ATR entry B to aborted, similarly to step 575 of the sequence of interactions 500.

Figure 7:
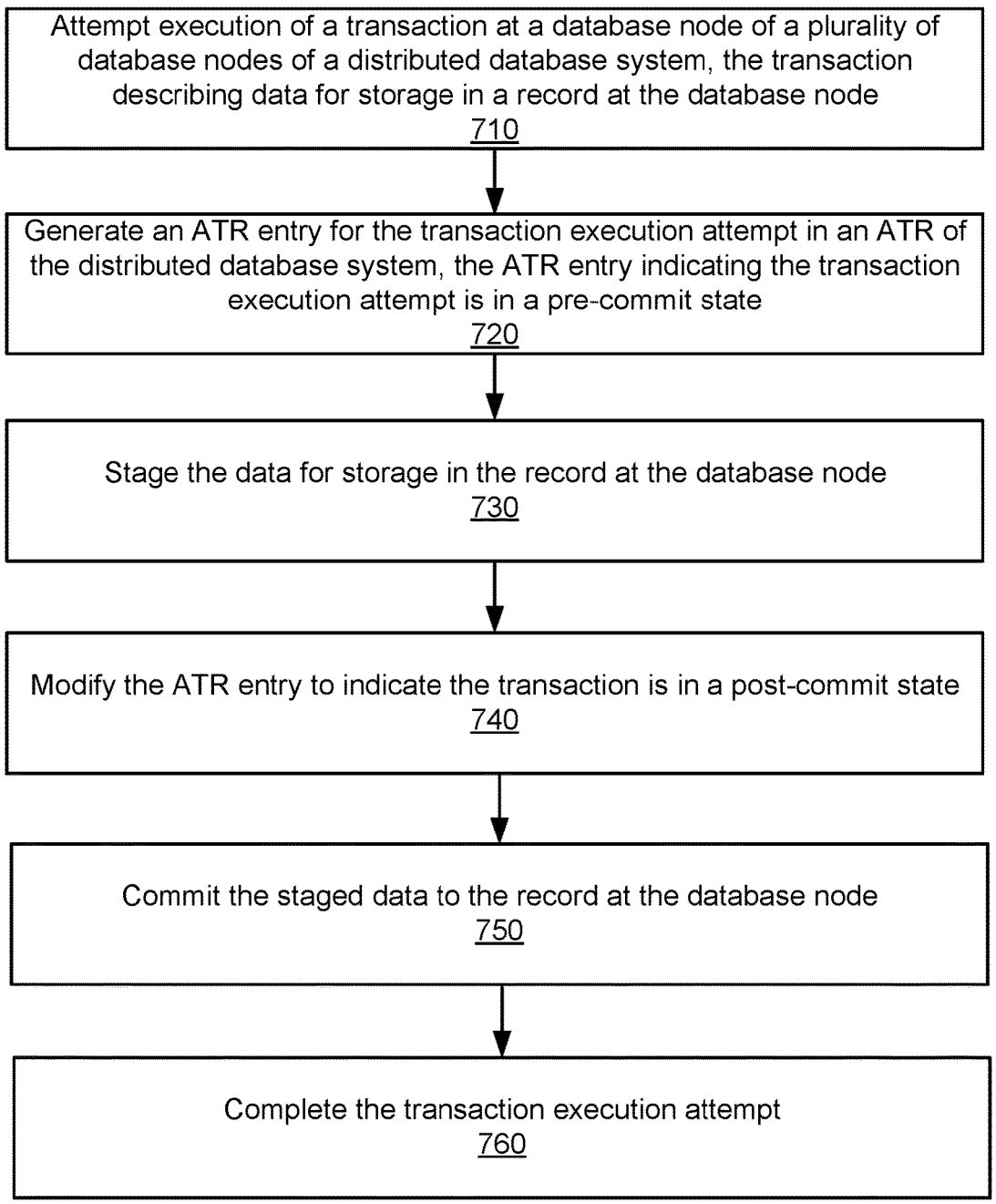
FIG. 7 is a flow chart illustrating a process for executing a transaction in a distributed database system, according to an embodiment.
Figure 8:
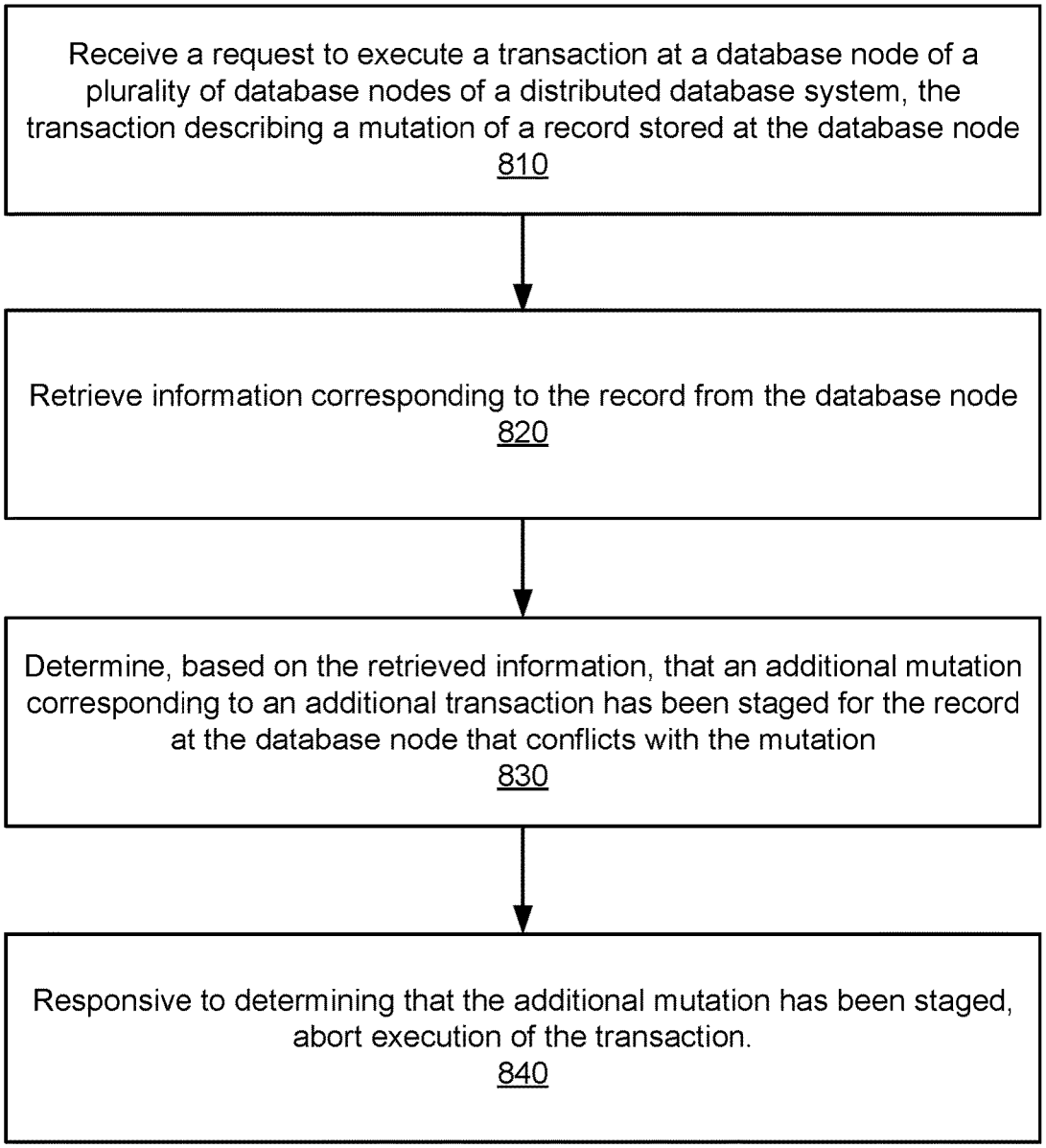
FIG. 8 is a flow chart illustrating a process for preventing a conflict between two or more transaction execution attempts in a distributed database system, according to an embodiment.
Figure 9:
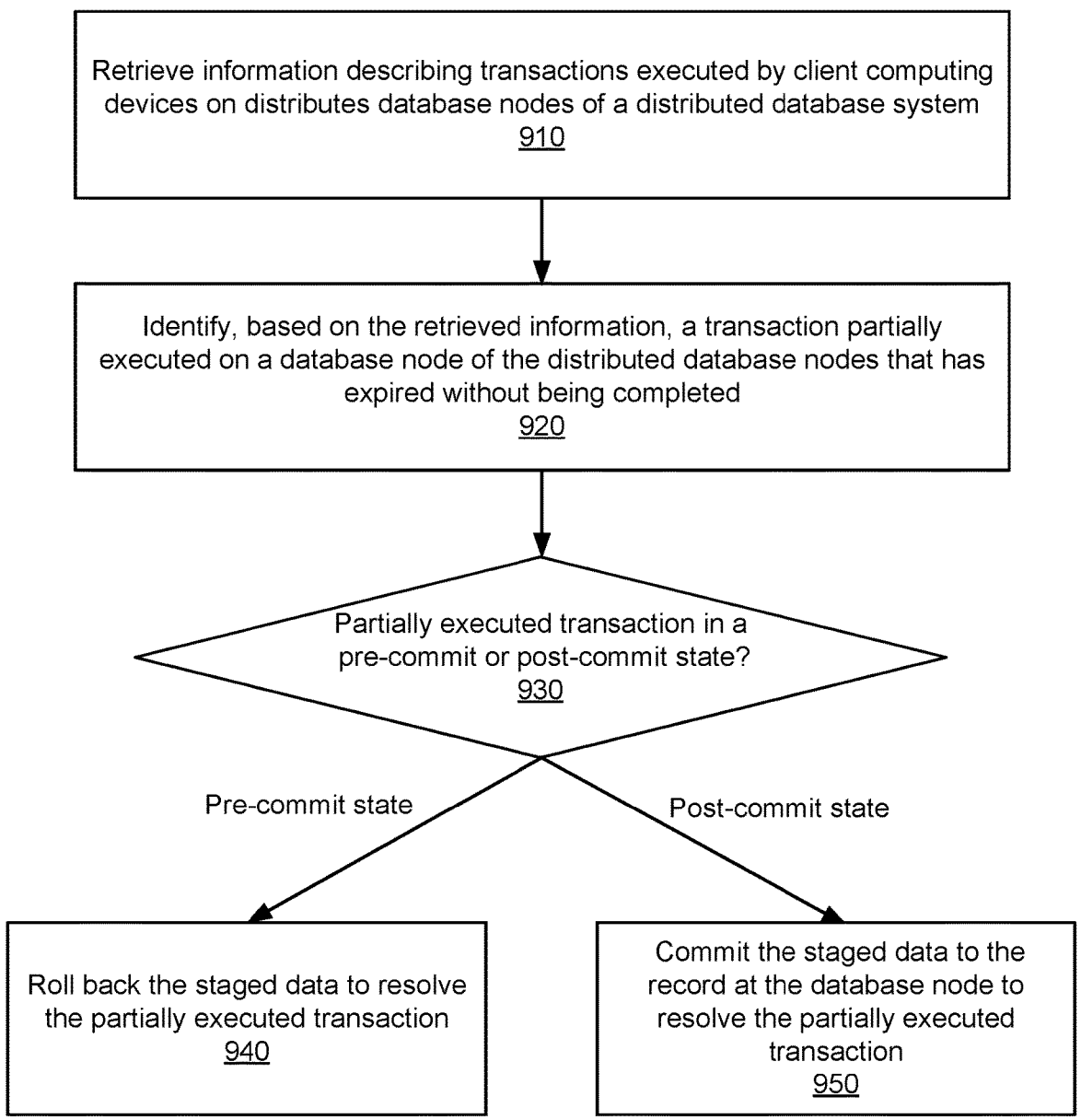
FIG. 9 is a flow chart illustrating a process for resolving partially executed transactions that could not be successfully completed in a distributed database system, according to an embodiment.

FIGS. 7-9 are flow charts illustrating embodiments of processes related to executing transactions in a distributed database system (e.g., the distributed database system 110). As described herein, the processes illustrated in FIGS. 7-9 are performed by a client system, such as a one of the client systems 120. For example, the steps of the processes illustrated in FIGS. 7-9 may be performed by one or more components described above with reference to the client application 200. In other embodiments, other entities may perform some or all of the steps illustrated in FIGS. 7-9. Embodiments may also include different or additional steps or perform the steps in different orders. The processes illustrated in FIGS. 7-9 are also performed in relation to one or more database nodes, which may represent one or more data servers 116 or virtual database nodes, as described above with reference to the distributed database system 110.

FIG. 7 is a flow chart illustrating an embodiment of a process 700 for executing a transaction in a distributed database system. In the embodiment shown in FIG. 7, a client system attempts 710 execution of a transaction at a database node of a plurality of database nodes of the distributed database system, where the transaction describes data for storage in a record at the database node. For instance, the client system may receive a transaction represented as a lambda function, such as a transaction provided by the client application 200. The client system may attempt to execute the transaction using an API or SDK corresponding to the distributed database system, or some combination thereof, as described above with reference to the client application 200. The data described by the transaction may, for example, be a mutation to an existing record stored by the database or may be an insertion of a new record at the database node.

As part of the attempt to execute the transaction, the client system generates 720 an ATR entry for the transaction execution attempt in an ATR of the distributed database system, where the generated ATR indicates that the transaction execution attempt is in a pre-commit state. For instance, the ATR entry may indicate that the transaction execution attempt is "pending." If the transaction is represented as a lambda function, the client system may generate 720 the ATR entry by executing a set of API instructions included in the lambda function configured to generate ATR entries.

As further part of the attempt to execute the transaction, the client system stages 730 the data for storage in the record at the database node. For instance, if the data corresponds to a mutation described by the transaction, the client system may stage the mutation in a set of virtual attributes of the record. As another example, if the data corresponds to an insertion described by the transaction, the client system may stage the insertion in a hidden record at the database node. If the transaction is represented as a lambda function, the client system may stage 730 the data by executing a set of API instructions included in the lambda function configured to stage data in the records at the distributed database system.

As further part of the attempt to execute the transaction, after successfully staging 730 the data, the client system modifies 740 the ATR entry to indicate that the transaction is in a post-commit state. For instance, the ATR entry may be modified to indicate that the transaction execution attempt is "committed." During the post-commit state, client systems accessing the record before the staged data has been committed to the record still use the staged data rather than data persistently stored by the record (e.g., stored in a body of the record). If the transaction is represented as a lambda function, the client system may modify 740 the ATR entry by executing a set of API instructions included in the lambda function configured to modify ATR entries.

As further part of the attempt to execute the transaction, during the post-commit state the client system commits 750 the staged data to the record at the database node. For instance, if the data corresponds to a mutation staged in a set of virtual attributes of the record, the client system may commit the staged mutation by updating a body of the record to persistently reflect the mutation staged in the virtual attributes and remove the staged mutation from the virtual attributes. As another example, if the data corresponds to an insertion staged in a hidden record on the database node, the client system may commit the staged insertion by converting the hidden record to a non-hidden record. If the transaction is represented as a lambda function, the client system may commit 750 the staged data by executing a set of API instructions included in the lambda function configured to commit data staged at the distributed database system.

After successfully committing 750 the staged data, the client system completes 760 the transaction execution attempt. For instance, the client system may complete 760 the transaction execution attempt responsive to successfully committing all individual mutations or insertions described by the transaction. In order to complete the transaction, the client system may modify the ATR entry to indicate that the transaction is in a completed state. If the transaction is represented as a lambda function, the client system may complete 760 the transaction execution attempt by executing a set of API instructions included in the lambda function configured to complete transaction execution attempts.

FIG. 8 is a flow chart illustrating an embodiment of a process 800 for preventing a conflict between two or more transaction execution attempts in a distributed database system. In the embodiment shown in FIG. 8, a client system receives 810 a request to execute a transaction at a database node of a plurality of database nodes of the distributed database system, where the transaction describes a mutation of a record stored at the database node. For instance, the client system may receive or attempt to execute the transaction as described above with reference to step 710 of the process 700.

Responsive to the request to execute the transaction, the client system retreives 820 information corresponding to the record from the database node. For instance, the client system may retrieve data stored in association with the record, such a set of virtual attributes for the record or a CAS value for the record.

Based on the retrieved information, the client system determines 830 that an additional mutation corresponding to an additional transaction has been staged for the record at the database node that conflicts with the mutation. For instance, another client system concurrently attempting to execute the additional transaction may have staged the additional mutation. The client system may identify the additional mutation in a set of virtual attributes of the record included in the retrieved information. As another example, an attempt by the client system to stage the mutation in the set of virtual attributes of the record may be rejected by the database node responsive to a CAS value provided by the client system differing from a current CAS value for the record. In some cases, the client system may also confirm that the staged additional mutation corresponds to a transaction in a pre-commit state, such as by accessing an ATR entry corresponding to the additional transaction.

Responsive to determining that the additional mutation has been staged, the client system aborts 840 execution of the transaction. For instance, the client system may modify an ATR entry corresponding to the transaction to indicate that the transaction execution attempt is in an aborted state. The client system may additionally, or alternatively, rollback any previously staged mutations or insertions corresponding to the transaction execution attempt. After aborting the transaction, the client system may reattempt executing the transaction, e.g., if the transaction has not expired.

FIG. 9 is a flow chart illustrating an embodiment of a process 900 for resolving partially executed transactions that could not be successfully completed in a distributed database system. In the embodiment shown in FIG. 9, the client system retreives 910 information describing transactions executed by client computing devices on distributed database nodes of a a distributed database system. For instance, the client system may access ATRs corresponding to the distributed database nodes.

Based on the retrieved information, the client system identifies 920 a transaction partially executed on a database node of the distributed database nodes that has expired without being completed. For instance, the partially executed transaction may be a lost transaction, as described above with reference to the transaction cleanup module 240.

After identifying the partially executed transaction, the client system resolves the partially executed transaction. In order to resolve the partially executed transaction, the client system determines 930 whether the partially executed transaction is in a pre-commit or a post commit state. For instance, the client system may determine the state of the partially executed transaction using an ATR entry corresponding to the partially executed transaction.

If the partially executed transaction is in a pre-commit state, the client system 940 rolls back the stated data to resolve the partially executed transaction. For example, the client system may use the transaction rollback module 230 to roll back the transaction. Alternatively, if the partially executed transaction is in a post-commit state, the client system commits 950 the staged data to the record at the database node to resolve the partially executed transaction. For example, the client system may use the transaction execution module 220 to complete execution of the partially executed transaction.

Computer Architecture

Figure 10:
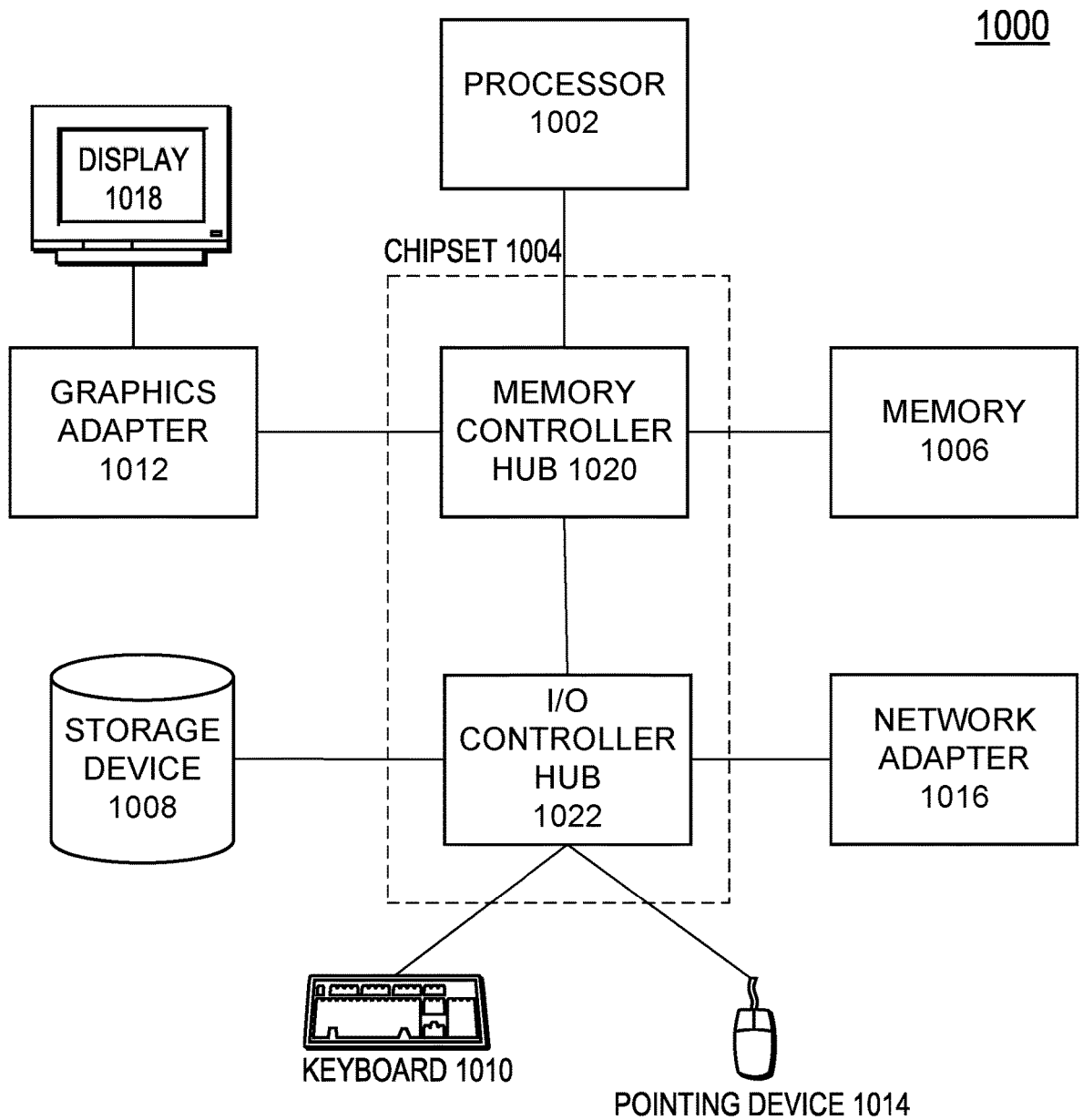
FIG. 10 is a high-level block diagram illustrating a functional view of a typical computer system for use as one of the entities illustrated in FIG. 1, according to an embodiment

FIG. 10 is a high-level block diagram illustrating a functional view of a typical computer system for use as one of the entities illustrated in the system environment 100 of FIG. 1, according to an embodiment. Illustrated are at least one processor 1002 coupled to a chipset 1004. Also coupled to the chipset 1004 are a memory 1006, a storage device 1008, a keyboard 1010, a graphics adapter 1012, a pointing device 1014, and a network adapter 1016. A display 1018 is coupled to the graphics adapter 1012. In one embodiment, the functionality of the chipset 1004 is provided by a memory controller hub 1020 and an I/O controller hub 1022. In another embodiment, the memory 1006 is coupled directly to the processor 1002 instead of the chipset 1004.

The storage device 1008 is a non-transitory computer-readable storage medium, such as a hard drive, compact disk read-only memory (CD-ROM), DVD, or a solid-state memory device. The memory 1006 holds instructions and data used by the processor 1002. The pointing device 1014 may be a mouse, track ball, or other type of pointing device, and is used in combination with the keyboard 1010 to input data into the computer system 1000. The graphics adapter 1012 displays images and other information on the display 1018. The network adapter 1016 couples the computer system 1000 to a network.

As is known in the art, a computer 1000 can have different and/or other components than those shown in FIG. 10. In addition, the computer 1000 can lack certain illustrated components. For example, a computer system 1000 acting as a server (e.g., a data server 116) may lack a keyboard 1010 and a pointing device 1014. Moreover, the storage device 1008 can be local and/or remote from the computer 1000 (such as embodied within a storage area network (SAN)).

The computer 1000 is adapted to execute computer modules to provide the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1008, loaded into the memory 1006, and executed by the processor 1002.

The types of computer systems 1000 used by the entities of FIG. 1 can vary depending upon the embodiment and the processing power used by the entity. For example, a client system 120 may be a mobile phone with limited processing power, a small display 1018, and may lack a pointing device 1014. The entities of the distributed database system 110, in contrast, may comprise multiple blade servers working together to provide the functionality described herein.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcodes, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for toring electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs that may be used to employ the described techniques and approaches. Thus, while particular embodiments and applications have been illustrated and described, it is to be understood that the described subject matter is not limited to the precise construction and components disclosed. The scope of protection should be limited only by the following claims.

We claim:

1. A non-transitory computer-readable storage medium for storing instructions that, when executed by a computer processor, cause the computer processor to perform steps comprising:

receiving a first request to execute a first transaction from a first client system at a database node of a distributed database system, the transaction describing a mutation of a record stored at the database node, wherein the record is associated with a check-and-set (CAS) value that is updated responsive to modifications to the record;

retrieving the record from the database node and sending the record to the first client system, causing the first client system to identify the CAS value from the received record;

receiving a second request to execute a second transaction from a second client system at the database node of the distributed database system;

retrieving the record from the database node and sending the record to the second client system, causing the second client system to identify the CAS value from the received record;

receiving a request from the first client system or the second client to attempt to stage a first mutation of the record based on the first transaction or a second mutation of the record based on the second transaction, the request comprising the CAS value received by the first client system or the second client system;

detecting whether a mismatch between the CAS value received with the request and a current CAS value of the record is present, the mismatch indicating that an additional mutation corresponding to an additional transaction has been staged for the record at the database node, the additional mutation conflicting with the first mutation or the second mutation corresponding to the request received from the first client system or the second client system;

responsive to detecting the mismatch, aborting the attempt to execute the first transaction or the second transaction corresponding to the request received from the first client system or the second client system; and responsive to detecting no mismatch,
staging the first mutation or the second mutation corresponding to the request received from the first client system or the second client system; and
causing the CAS value associated with the record to be updated to a different CAS value.

2. The non-transitory computer-readable storage medium of claim 1, wherein aborting execution of the transaction comprises:
modifying an active transaction record (ATR) entry for the transaction in an ATR on the distributed database system to indicate the transaction is in an aborted state.

3. The non-transitory computer-readable storage medium of claim 1, wherein staging the first mutation or the second mutation comprises:
modifying active transaction record (ATR) entry for the transaction in an ATR on the distributed database system to indicate the transaction is in a changing state.

4. The non-transitory computer-readable storage medium of claim 1, wherein the CAS value is stored with the record at the database node.

5. The non-transitory computer-readable storage medium of claim 1, wherein the distributed database system comprises a second database node, and the steps further comprise:
receiving a third request to execute a third transaction from a third client system at the second database node of the distributed database system;
retrieving the from the second database node and sending the record to the third client system, causing the third client system to identify the CAS value from the received record;
receiving a request from the third client system to attempt to stage a third mutation of the record based on the third transaction, the request comprising the CAS value received by the third client system;
detecting whether a mismatch between the CAS value received with the request and a current CAS value of the record is present, the mismatch indicating that an additional mutation corresponding to an additional transaction has been staged for the record at the database node, the additional mutation conflicting with the first mutation or the second mutation corresponding to the request received from the first client system or the second client system;
responsive to detecting the mismatch, aborting the attempt to execute the third transaction;
responsive to detecting no mismatch,
staging the third mutation; and
causing the CAS value associated with the record to be updated to a different CAS value.

6. The non-transitory computer-readable storage medium of claim 1, wherein aborting the attempt further comprises rolling back the attempt to execute the first transaction or the second transaction corresponding to the received request.

7. The non-transitory computer-readable storage medium of claim 6, wherein staging the first mutation or the second mutation comprises generating a hidden record on the database node, and wherein rolling back the attempt to execute the first transaction or the second transaction further comprises:
removing the hidden record from the database node.

8. The non-transitory computer-readable storage medium of claim 1, wherein the steps further comprise:
after aborting the attempt to execute the transaction, determining if the transaction has not expired; and
responsive to determining the transaction has not expired, reattempting to execute the transaction at the database node.

9. The non-transitory computer-readable storage medium of claim 8, wherein reattempting to execute the transaction comprises:
delaying the reattempt to execute that transaction by a randomized time period.

10. The non-transitory computer-readable storage medium of claim 8, wherein reattempting comprises reattempting for a threshold number of times.

11. A computing system comprising:
one or more processors; and
a non-transitory computer-readable storage medium for storing instructions that when executed by the one or more processors cause the one or more processors to perform steps comprising:
receiving a first request to execute a first transaction from a first client system at a database node of a distributed database system, the transaction describing a mutation of a record stored at the database node, wherein the record is associated with a check-and-set (CAS) value that is updated responsive to modifications to the record;
retrieving the record from the database node and sending the record to the first client system, causing the first client system to identify the CAS value from the received record;
receiving a second request to execute a second transaction from a second client system at the database node of the distributed database system;
retrieving the record from the database node and sending the record to the second client system, causing the second client system to identify the CAS value from the received record;
receiving a request from the first client system or the second client to attempt to stage a first mutation of the record based on the first transaction or a second mutation of the record based on the second transaction, the request comprising the CAS value received by the first client system or the second client system;
detecting whether a mismatch between the CAS value received with the request and a current CAS value of the record is present, the mismatch indicating that an additional mutation corresponding to an additional transaction has been staged for the record at the database node, the additional mutation conflicting with the first mutation or the second mutation corresponding to the request received from the first client system or the second client system;
responsive to detecting the mismatch, aborting the attempt to execute the first transaction or the second transaction corresponding to the request received from the first client system or the second client system; and
responsive to detecting no mismatch,
staging the first mutation or the second mutation corresponding to the request received from the first client system or the second client system; and
causing the CAS value associated with the record to be updated to a different CAS value.

12. The computing system of claim 11, wherein aborting execution of the transaction comprises:
modifying an active transaction record (ATR) entry for the transaction in an ATR on the distributed database system to indicate the transaction is in an aborted state.

13. The computing system of claim 11, wherein staging the first mutation or the second mutation comprises:
modifying active transaction record (ATR) entry for the transaction in an ATR on the distributed database system to indicate the transaction is in a changing state.

14. The computing system of claim 13, wherein the CAS value is stored with the record at the database node.

15. The computing system of claim 11, wherein the distributed database system comprises a second database node, and the steps further comprises:
receiving a third request to execute a third transaction from a third client system at the second database node of the distributed database system;
retrieving the from the second database node and sending the record to the third client system, causing the third client system to identify the CAS value from the received record;
receiving a request from the third client system to attempt to stage a third mutation of the record based on the third transaction, the request comprising the CAS value received by the third client system;
detecting whether a mismatch between the CAS value received with the request and a current CAS value of the record is present, the mismatch indicating that an additional mutation corresponding to an additional transaction has been staged for the record at the database node, the additional mutation conflicting with the first mutation or the second mutation corresponding to the request received from the first client system or the second client system;
responsive to detecting the mismatch, aborting the attempt to execute the third transaction;
responsive to detecting no mismatch,
    staging the third mutation; and
    causing the CAS value associated with the record to be updated to a different CAS value.

16. The computing system of claim 11, wherein aborting the attempt further comprises rolling back the attempt to execute the first transaction or the second transaction corresponding to the received request.

17. The computing system of claim 11, wherein staging the first mutation or the second mutation comprises generating a hidden record on the database node, and wherein rolling back the attempt to execute the first transaction or the second transaction further comprises:
removing the hidden record from the database node.

18. The computing system of claim 11, wherein the steps further comprise:
after aborting the attempt to execute the transaction, determining if the transaction has not expired; and
responsive to determining the transaction has not expired, reattempting to execute the transaction at the database node.

19. The computing system of claim 11, wherein reattempting to execute the transaction comprises:
delaying the reattempt to execute that transaction by a randomized time period.

20. A method comprising:
receiving a first request to execute a first transaction from a first client system at a database node of a distributed database system, the transaction describing a mutation of a record stored at the database node, wherein the record is associated with a check-and-set (CAS) value that is updated responsive to modifications to the record;
retrieving the record from the database node and sending the record to the first client system, causing the first client system to identify the CAS value from the received record;
receiving a second request to execute a second transaction from a second client system at the database node of the distributed database system;
retrieving the record from the database node and sending the record to the second client system, causing the second client system to identify the CAS value from the received record;
receiving a request from the first client system or the second client to attempt to stage a first mutation of the record based on the first transaction or a second mutation of the record based on the second transaction, the request comprising the CAS value received by the first client system or the second client system;
detecting whether a mismatch between the CAS value received with the request and a current CAS value of the record is present, the mismatch indicating that an additional mutation corresponding to an additional transaction has been staged for the record at the database node, the additional mutation conflicting with the first mutation or the second mutation corresponding to the request received from the first client system or the second client system;
responsive to detecting the mismatch, aborting the attempt to execute the first transaction or the second transaction corresponding to the request received from the first client system or the second client system; and
responsive to detecting no mismatch,
    staging the first mutation or the second mutation corresponding to the request received from the first client system or the second client system; and
    causing the CAS value associated with the record to be updated to a different CAS value.

\* \* \* \* \*

UNITED STATES PATENT AND TRADEMARK OFFICE
CERTIFICATE OF CORRECTION

PATENT NO. : 12,298,966 B2
APPLICATION NO. : 18/418097
DATED : May 13, 2025
INVENTOR(S) : Pople et al.

Page 1 of 1

It is certified that error appears in the above-identified patent and that said Letters Patent is hereby corrected as shown below:

On the Title Page

Item (71), in Column 1, in "Applicant", Line 1, delete "Inc." and insert -- Inc., Santa Clara, CA (US) --, therefor.

Item (73), in Column 1, in "Assignee", Line 1, delete "Inc." and insert -- Inc., Santa Clara, CA (US) --, therefor.

In the Claims

In Column 25, in Claim 5, Line 8, delete "the from" and insert -- the record from --, therefor.

In Column 26, in Claim 15, Line 58, delete "the from" and insert -- the record from --, therefor.

Signed and Sealed this
Fifth Day of August, 2025

Coke Morgan Stewart
*Acting Director of the United States Patent and Trademark Office*